United States Patent
Ledvina et al.

(10) Patent No.: US 7,305,021 B2
(45) Date of Patent: Dec. 4, 2007

(54) REAL-TIME SOFTWARE RECEIVER

(75) Inventors: Brent M. Ledvina, Ithaca, NY (US);
Mark L. Psiaki, Brooktondale, NY (US); Steven P. Powell, Ithaca, NY (US); Paul M. Kintner, Jr., Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 11/316,536

(22) Filed: Dec. 22, 2005

(65) Prior Publication Data

US 2006/0227856 A1    Oct. 12, 2006

Related U.S. Application Data

(62) Division of application No. 10/753,927, filed on Jan. 8, 2004, now Pat. No. 7,010,060.

(60) Provisional application No. 60/439,391, filed on Jan. 10, 2003.

(51) Int. Cl.
H04K 1/10    (2006.01)
(52) U.S. Cl. ....................... 375/137; 708/250
(58) Field of Classification Search ............... 375/137; 708/250, 252, 255
See application file for complete search history.

(56) References Cited

U.S. PATENT DOCUMENTS

| | | | |
|---|---|---|---|
| 5,592,173 A | 1/1997 | Lau et al. | 342/357 |
| 5,897,605 A | 4/1999 | Kohli et al. | 701/213 |
| 6,795,487 B1 * | 9/2004 | Bickerstaff et al. | 375/147 |
| 7,010,060 B2 * | 3/2006 | Ledvina et al. | 375/316 |

FOREIGN PATENT DOCUMENTS

WO    WO 2004/036238    10/2003

OTHER PUBLICATIONS

*Real-Time GPS Software Radio Receiver*, Akos et al., ION NTM 2001, Jan. 22-24, 2001, Long Beach, CA, pp. 809-816.
*Global Positioning System Software Receiver (gpSrx) Implementation in Low Cost/Power Programmable Processors*, Akos et al., ION GPS 2001, Sep. 11-14, 2001, Salt Lake City, UT, pp. 2851-2858.
*GPS Receivers*, A. J. Van Dierendonck, Global Positioning System: Theory and Applications, B. W. Parkinson and J. J. Spilker, Jr., Eds., vol. I, American Institute of Aeronautics and Astronautics, 1996, Chapter 8, pp. 329-406.
*A Coming of Age for GPS: A Rtlinux Based GPS Receiver*, Ledvina et al., Proceedings of the Workshop on Real Time Operating Systems and Applications and Second Real Time Linux Workshop (in conjunction with IEEE RTSS 2000, Nov. 27-28, 2000, see http://gps.ece.cornell.edu/index.html, inventor supplied publication date).
*The New L2 Civil Signal*, R.D. Fontana et al., Proceedings of the ION GPS 2001, Sep. 11-14, 2001, Salt Lake City, UT, pp. 617-631, see http://www.findarticles.com/cf_dls/m0BPW/9_12/78573899/p8/article.jhtml?term=.

(Continued)

Primary Examiner—Temesghen Ghebretinsae
(74) Attorney, Agent, or Firm—Burns & Levinson LLP; Jacob N. Erlich; Kathleen Chapman

(57) ABSTRACT

A real-time software receiver that executes on a general purpose processor. The software receiver includes data acquisition and correlator modules that perform, in place of hardware correlation, baseband mixing and PRN code correlation using bit-wise parallelism.

26 Claims, 14 Drawing Sheets

OTHER PUBLICATIONS

*A 12-Channel Real-Time GPS L1 Software Receiver*, B. M. Ledvina et al., Proceedings of the ION National Technical Meeting, Jan. 22-24, 2003, Anaheim, CA, see http://gps.ece.cornell.edu/index.html, inventor supplied publication date.

*Bit-Wise Parallel Algorithms for Efficient Software Correlation Applied to a GPS Software Receiver*, B.M. Ledvina et al., to appear in the IEEE Transactions on Wireless Communications, 2003.

*Design and Practical Implementation of Multi-Frequency RF Front Ends Using Direct RF Sampling*, M.L. Psiaki et al., Preprint from ION GPS/GNSS 2003.

*Design and Implementation of a Direct Digitization GPS Receiver Front End*, D.M. Akos, IEEE Transactions on Mocrowave Theory and Techniques, vol. 44, No. 12, Dec. 1996.

*A High-Performance Real-Time GNSS Software Receiver and its Role in Evaluating Various Commercial Front End ASICs*, Jona Thor, ION GPS 2002, Sep. 24-27, 2002, pp. 2554-2560.

*Software Solution of GPS Baseband Processing*, Asai, et al., International Conference on Consumer Electronics, 1998 Digest of Technical Papers, Jun. 2-4, 1998, pp. 180-181.

* cited by examiner

| Quantity | Sequence | | | | | | | |
|---|---|---|---|---|---|---|---|---|
| Sample Times | $t_0$ | $t_1$ | $t_2$ | $t_3$ | $t_4$ | $t_5$ | $t_6$ | $t_7$ |
| 21 — RF Signal | 1 | 1 | -1 | -1 | -1 | 1 | 1 | 1 |
| Word Representation of Signal | 1 | 1 | 0 | 0 | 0 | 1 | 1 | 1 |
| PRN Code replica | 1 | 1 | -1 | -1 | 1 | 1 | 1 | 1 |
| Word Representation of PRN Code replica | 1 | 0 | 0 | 0 | 1 | 1 | 1 | 1 |
| Product of Signal and PRN Code replica | 1 | -1 | 1 | 1 | -1 | 1 | 1 | 1 |
| Word Representation of Product | 0 | 1 | 0 | 0 | 1 | 0 | 0 | 0 |

FIG. 2C

| Table Element | Code Time Offset | Bit Sequence of $L$ Code Chips (first is left-most, last is right-most) |
|---|---|---|
| $x(1)$ | $\Delta t_{0kmin}$ | 0 0 ... 0 0 0 0 0 |
| $x(2)$ | $\Delta t_{0kmin}$ | 0 0 ... 0 0 0 0 1 |
| $x(3)$ | $\Delta t_{0kmin}$ | 0 0 ... 0 0 0 1 0 |
| $x(4)$ | $\Delta t_{0kmin}$ | 0 0 ... 0 0 0 1 1 |
| ⋮ | ⋮ | ⋮ |
| $x(2^L)$ | $\Delta t_{0kmin}$ | 1 1 ... 1 1 1 1 1 |
| $x(2^L+1)$ | $\Delta t_{0(kmin+1)}$ | 0 0 ... 0 0 0 0 0 |
| $x(2^L+2)$ | $\Delta t_{0(kmin+1)}$ | 0 0 ... 0 0 0 1 0 |
| ⋮ | ⋮ | ⋮ |
| $x(2^L \times k_{tot})$ | $\Delta t_{0kmax}$ | 1 1 ... 1 1 1 1 1 |

FIG. 5

Code Offset (chips)

REAL-TIME SOFTWARE RECEIVER

CROSS REFERENCE TO RELATED APPLICATIONS

The present application is a divisional application of U.S. patent application Ser. No. 10/753,927, filed Jan. 8, 2004 now U.S. Pat. No. 7,010,060. The present application claims priority to U.S. Provisional Application No. 60/439,391 filed Jan. 10, 2003 entitled REAL-TIME SOFTWARE RECEIVER which is incorporated herein in its entirety by reference.

STATEMENT OF GOVERNMENT INTEREST

This invention was made with United States Government support from the Office of Naval Research (ONR) under contract number N00014-02-J-1822 and from the National Aeronautics and Space Administration (NASA) under contract numbers NCC5-563, NAG5-11819, and NAG5-12089. The United States Government has certain rights in the invention.

BACKGROUND OF THE INVENTION

This invention relates generally to software radio receivers, and more specifically to a software receiver for positioning systems.

A typical positioning system receiver, such as is used in the Global Positioning System (GPS), includes an antenna, a radio frequency (RF) section, a correlator, a signal tracking and demodulation component, and a component to compute the navigation solution. The antenna, which is possibly followed by a pre-amplifier, receives L-band GPS signals. The RF section filters and down converts the GHz GPS signal to an intermediate frequency in the MHz range. The RF section also digitizes the signal. The correlator separates the down-converted signal into different channels (ten or more in modern receivers) allocated to each satellite. For each satellite, the correlator mixes the Doppler-shifted intermediate frequency signal to baseband by correlating it with a local copy of the carrier replica signal and it distinguishes the particular satellite by correlating the signal with a pseudo-random number (PRN) code. Software routines cause the carrier replica and PRN replica signals to track the actual received signal, extract the navigation message, and compute the navigation solution.

Baseband mixing is a multiplication of an input signal by a complex exponential where the frequency of the complex exponential approximately matches that of the input signal. The resultant signal is centered at baseband. A complex signal can be broken down into cosine and sine signal components, resulting in separate in-phase and quadrature components. The frequency of the baseband mixed signal must be controllable to within a few millihertz in the case of a phase-locked loop for use in a precision navigation system, and the baseband mixed signal must have a continuously varying phase. In a hardware correlator, local oscillators generate cosine and sine signal components that have precise frequency control and a continuous phase. Generating cosine and sine signal components on the fly with the correct frequency and phase is too time consuming to be feasible for a software correlator. Instead, the software correlator generates cosine and sine signal components on a grid of frequencies off-line. These signal components must be stored on a time grid of points sampled at the RF front-end sampling frequency, for example, at 5.714 MHz for one particular RF front-end hardware configuration, and the signals must last for a typical accumulation period, e.g., for a 0.001 second coarse/acquisition (C/A) PRN code period when working with GPS L1 civilian signals. It takes tens of gigabytes of memory or more in order to brute-force store all frequencies on a one mHz grid ranging from −10 KHz to +10 KHz, which is the needed frequency range when tracking GPS satellites from a terrestrial receiver, and additional storage is required to store a grid of possible starting phases at each frequency point.

PRN code mixing is a multiplication of a baseband mixed signal by a prompt +1/−1 PRN code or by a +2/0/−2 early-minus-late PRN code, where the code timing and frequency approximately match that of the input signal. The resultant signal is a constant in the case of prompt PRN code mixing, and an approximately linear function of the code timing error in the case of early-minus-late mixing. A receiver accumulates both of these correlation outputs. The magnitude of the prompt accumulation indicates signal strength and whether a signal has been detected, and its in-phase (real) and quadrature (imaginary) components are used to measure carrier phase and Doppler shift. The magnitude of the early-minus-late accumulation measures the code timing error; it will be zero when the timing error is zero.

The code phase of the baseband mixing signal must be controllable to within a percent or less of a PRN code chip for use in a precision navigation system. In a hardware correlator, local oscillators generate the prompt and early-minus-late PRN code replicas. A software correlator can either compute and store PRN code replicas, or compute them in real-time.

The current Global Positioning System is slated to realize expanded capabilities that include new civilian codes on the L2 frequency, a new L5 frequency, and new codes (M-code, CL and CM codes) on the L2 frequency. Some of these upgrades are slated to start within one to three years. A hardware correlator requires hardware modifications in order to use these new signals. In the near term, a receiver designer will be faced with a complex trade-off in order to decide whether the extra complexity is worth the improved performance that will accrue only very slowly as new GPS satellites replace older models. One way to avoid the complex trade-off is to use a software receiver that can receive and process new signals without the need for a new correlator chip set.

A software receiver is flexible because its software components can be easily modified. One application of a software receiver is to merge together numerous devices that use wireless digital communication protocols to form a single device. For example, a cell phone, GPS receiver, and Personal Data Assistant (PDA) could become a single device that plays the role of all three. Another use of a software receiver is to shorten development and to-market times for new wireless devices. For example, as new frequencies and codes are added to GPS, a software receiver having a software correlator simply needs to be reprogrammed, while a hardware approach would require a brand new correlator chip design. New PRN codes can be used simply by making software changes. Thus, software receiver technology lessens the risks involved for designers during the period of transition to the new signals. Furthermore, a software receiver could be reprogrammed to use the Galileo system (European GPS) or GLONASS (Russian GPS).

In the recent past, GPS software receivers have been developed that either post-process stored signals or operate in real-time. Previous real-time software receivers function with a limited number of channels (4-6) or require high-end computer speeds or digital signal processor (DSP) chips such as are disclosed in *Real-Time GPS Software Radio Receiver*, Akos et al., ION NTM 2001, 22-24 Jan. 2001, Long Beach, Calif., pp. 809-816 (Akos 2001a), and *Global Positioning System Software Receiver (gpSrx) Implementation in Low Cost/Power Programmable Processors*, Akos et al., ION GPS 2001, 11-14 Sep. 2001, Salt Lake City, Utah, pp. 2851-2858, both incorporated herein in their entireties by reference.

Therefore, it is an object of the present invention to create a software receiver that operates in real-time and is not restricted to a severely limited number of channels or to a very fast processor.

Another object of the present invention is to minimize the number of sine and cosine signal components that must be stored.

A further object of the present invention is to process incoming signals through bit-wise parallelism.

A still further object of the present invention is to process over-sampled signals by use of bit-wise parallelism.

A still further object of the present invention is to use very long over-sampled PRN codes efficiently in a bit-wise parallel software receiver.

SUMMARY OF THE INVENTION

The objects set forth above as well as further and other objects are addressed by the present invention. The solutions and advantages of the present invention are achieved by the illustrative embodiment described herein below.

The software receiver system and method of the present invention enable the efficient execution of a set of algorithms, that perform software correlation on data sampled from incoming channels, on a general purpose processor. The system and method of the present invention provide for either PRN code storage or computation of PRN codes in real-time. PRN code storage is appropriate for PRN codes that have short periods, such as the GPS coarse/acquisition codes, which are 1023 chips long. In this case, the system and method of the present invention pre-compute over-sampled replicas of entire PRN code periods and store them for orderly and efficient retrieval, such as in a table. This table can include a selection of code start times as measured relative to the sample times at which RF data are available from the receiver front end. There is a separate table for each unique PRN code.

The system and method of the present invention can also generate over-sampled versions of the prompt and early-minus-late PRN codes in real-time through use of an over-sampling function described herein. The values of the over-sampling function can be located in a specially designed table that can be generic across PRN codes. The length of the specially designed table can be independent of the length of the PRN code whose replica is being used to process a given received signal. The system and method of the present invention include techniques for efficiently calculating indices into the specially designed table that enable rapid, real-time table look-up.

The system of the present invention includes a software correlator that can mix the received signal to baseband, compute baseband/PRN correlations through bit-wise parallelism and look-up tables using either the tabulated or real-time-generated PRN codes, and compute accumulations through bit-wise parallelism and processor instructions or look-up tables. Bit-wise parallelism allows the processing of multiple data samples simultaneously as the multiple bits of a given word of computer data. For example, for 32-bit words, the software correlator can process up to 32 samples at a time. Bit-wise parallelism can optimally operate when each signal in question can be represented by only a few bits, which is normally the case in RF digital signal processing of navigation signals.

The bit-wise parallel operations of the present invention can save computation time in comparison to integer mathematical correlation operations. If, for example, four accumulations are required per sample, integer mathematics requires six multiplications and four additions per sample (except for the last sample). At a sampling rate of, for example, 5.714 MHz this translates into 57,140 integer operations per PRN code period. In the illustrative embodiment, 33,500 bit-wise parallel operations are necessary per PRN code period when the RF signal has a 2-bit representation. This operation count is further reduced to approximately 16,750 bit-wise parallel operations per PRN code period when the RF signal has a 1-bit representation. Thus, there can be a savings of almost a factor of two to almost a factor of four in the operation count.

The system and method of the present invention also include a table of pre-computed baseband mixing sine waves, algorithms that can produce correlation accumulation outputs that are equivalent to what would be produced by a continuously variable sine wave, and a method of use of the table and algorithms. Thus, in the present invention, a relatively small set of sine wave values need to be pre-computed and saved, which can conserve computer memory and processing time.

The present invention also includes a system and method for tracking the phase of PRN code replicas in software in order to track the timing of any given "chip" of the PRN code replica as measured with respect to a pre-specified set of sample times at which the basic raw data comes out of the RF front end (a chip is an element of a PRN code). The PRN code phase is kept track of via a variable for each channel, that indicates the PRN code start time with respect to the RF sample times. The system and method of the present invention allow for the synchronization of the measurements of PRN code phase, carrier phase, and carrier frequency for each satellite relative to these sample times.

The method for tracking the phase of each PRN code replica and the phase of each carrier replica includes the steps of latching all the C/A code phases, carrier phases, epoch counters, and carrier frequencies for each satellite at a pre-specified time, and computing the pseudo range to each satellite using the C/A code phase and epoch counters. The method also includes the step of tracking and updating code and carrier phases by estimating code chipping rate and carrier Doppler shift inputs. The method further includes the step of computing the code phase at the pre-specified time for each satellite as a function of the updated code chipping rate and the pre-specified time. The method further includes the step of computing the carrier phase at the pre-specified time as a function of the updated carrier phase, the Doppler shift, and the pre-specified time. The timing of the PRN code phase (or chip location) is the most fundamental of GPS measurements for use in navigation data processing. The monitoring of these times in software allows complete control of the precision with which they can be measured, and it allows precise synchronization of these times with the measurement times of data from other sensors, such as inertial measurement units. This feature gives an enhanced ability to develop what are known as deeply coupled systems that must fuse GPS data with data from other types of sensor systems.

The software correlator of the present invention can advantageously be easily adapted to accept signals at any frequency, new PRN codes, or even signals for different types of devices. Thus, the same processing hardware could use the software correlator to implement such devices as a GPS receiver, a cell phone, or both. To allow for new codes, new frequencies, and new types of functionality, small changes can be made in the software correlator, or different versions of the software correlator can be run on the same processor. Hardware-correlator-based receivers of the prior art can deal only with frequencies and PRN codes that are hard-wired into their designs. Also, the system and method of the present invention could be implemented within systems such as GLONASS receivers, cell phones and cell base stations, pagers, wireless Ethernet (e.g. 802.11x standards), Bluetooth™, Blackberry® wireless internet devices, and satellite radio/phones (e.g. INMARSAT®). In fact, the system and method of the present invention are applicable to any sort of telecommunication system/device that uses spread spectrum, code division multiple access (CDMA) PRN codes for the transmission of information, either wired or wireless.

For a better understanding of the present invention, together with other and further objects thereof, reference is made to the accompanying drawings and detailed description. The scope of the present invention is pointed out in the appended claims.

DESCRIPTION OF THE SEVERAL VIEWS OF THE DRAWING

FIG. 2C is a graphic representation of a plot of bit-wise parallel radio frequency signal and PRN code replica storage and mixing;

FIG. 5 is a schematic diagram of a look-up table layout as a function of code time offset and chip bit pattern;

DETAILED DESCRIPTION OF THE INVENTION

Figure 1:
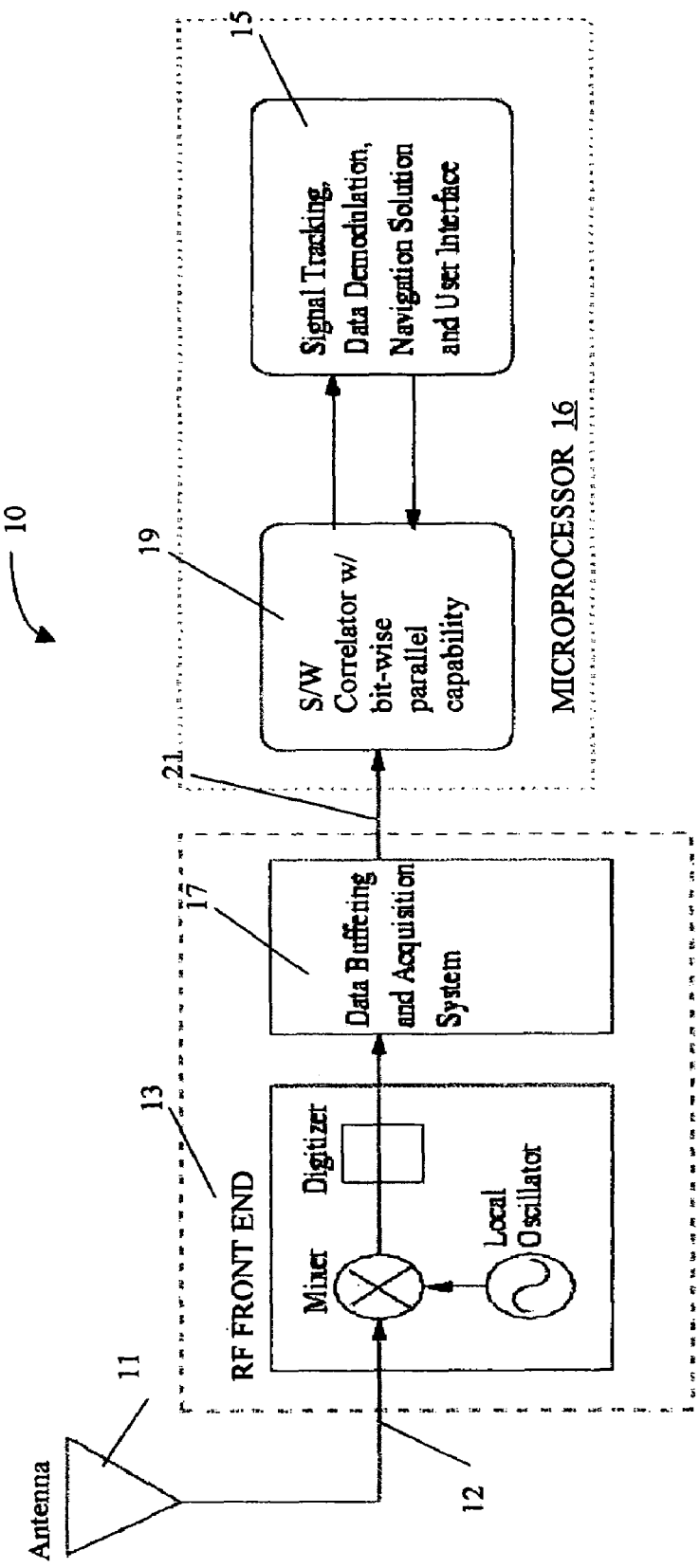
FIG. 1 is a schematic block diagram of the hardware environment of a typical software receiver.

The present invention is now described more fully hereinafter with reference to the accompanying drawings, in which the illustrative embodiment of the present invention is shown. The following configuration description is presented for illustrative purposes only. Any computer configuration satisfying the speed and interface requirements herein described may be suitable for implementing the system of the present invention. The equations herein are stated in general terms, but have parameters that are specific to the GPS L1 C/A signal for illustrative purposes only. For example, the 0.001 sec. accumulation interval seen in many of the equations is the nominal C/A code period. Also, the C/A PRN code of the illustrative embodiment can be replaced by the PRN code of any other CDMA signaling system.

By way of introductory explanation, RF signal processing equations and terms are herein provided. The time-domain L1 C/A signal received from, for example, a satellite, is represented by:

$$y(t_i) = \sum_j A_j D_{jk} C_j\left[0.001\left(\frac{t_i - \tau_{jk}}{\tau_{jk+1} - \tau_{jk}}\right)\right]\cos[\omega_{IF}t_i - \phi_j(t_i)] + n_j \quad (1)$$

where $t_i$ is the sample time, $A_j$ is the amplitude, $D_{jk}$ is the navigation data bit, $C_j[t]$ is the C/A code, $\tau_{jk}$ and $\tau_{jk+1}$ are the start times of the received $k^{th}$ and $k+1^{st}$ C/A code periods, $\omega_{IF}$ is the intermediate frequency corresponding to the L1 carrier frequency, $\phi_j(t_i)$ is the carrier phase perturbation due to accumulated delta range, $n_j$ is the receiver noise, and the subscript j refers to a particular GPS satellite. The summation is over all visible GPS satellites. The negative sign in front of $\phi(t_i)$ comes from the high-side mixing that occurs in the RF front-end that has been used in the illustrative embodiment. The signal in equation (1) is the output of a typical RF front end.

A GPS receiver works with correlations between the received signal and a replica of it. The correlations are used to acquire and track the signal. The replica is composed of two parts, the carrier replica and the C/A PRN code replica. Two carrier replica signals are used, an in-phase signal and a quadrature signal. When mixed with the received signal from the RF front end they form the in-phase and quadrature baseband mixed signals represented by:

$$y_{Ij}(t_i) = C_j\left[0.001\left(\frac{t_i - \hat{\tau}_{jk}}{\hat{\tau}_{jk+1} - \hat{\tau}_{jk}}\right)\right]\cos\{\omega_{IF}t_i - [\hat{\phi}_{jk} + \hat{\omega}_{Doppjk}(t_i - \hat{\tau}_{jk})]\} \quad (2)$$

$$y_{Qj}(t_i) = -C_j\left[0.001\left(\frac{t_i - \hat{\tau}_{jk}}{\hat{\tau}_{jk+1} - \hat{\tau}_{jk}}\right)\right]\sin\{\omega_{IF}t_i - [\hat{\phi}_{jk} + \hat{\omega}_{Doppjk}(t_i - \hat{\tau}_{jk})]\} \quad (3)$$

where equations (2) and (3) apply during the $k^{th}$ C/A code period. In these equations $\hat{\tau}_{jk}$ and $\hat{\tau}_{jk+1}$ are the receiver's estimates of the start times of the $k^{th}$ and $k+1^{st}$ code periods, $\hat{\phi}_{jk}$ is the estimated carrier phase at time $\hat{\tau}_{jk}$, and $\hat{\omega}_{Doppjk}$ is the estimated carrier Doppler shift during the k$^{th}$ code period.

A typical receiver computes the estimates $\hat{\tau}_{jk}$, $\hat{\tau}_{jk+1}$, $\hat{\phi}_{jk}$, and $\hat{\omega}_{Doppjk}$ by various conventional means that are described in GPS Receivers, A. J. Van Dierendonck, *Global Positioning System: Theory and Applications*, B. W. Parkinson and J. J. Spilker, Jr., Eds., vol. I, American Institute of Aeronautics and Astronautics, 1996, Chapter 8, pp. 329-406 (Dierendonck), incorporated herein in its entirety by reference. These include open-loop acquisition methods and closed-loop signal tracking methods such as a delay-locked loop to compute $\hat{\tau}_{jk}$ and $\hat{\tau}_{jk+1}$ and a phase-locked loop or a frequency-locked loop to compute $\hat{\phi}_{jk}$ and $\hat{\omega}_{Dppjk}$. The software receiver developed herein uses conventional techniques for forming these estimates.

Both prompt and early-minus-late correlations are needed to track the carrier frequency, carrier phase, and code phase in a GPS receiver. A typical receiver uses the PRN code and carrier replicas to compute the following in-phase and quadrature correlation accumulations:

$$I_{jk}(\Delta) = \sum_{i=i_k}^{i_k+N_k} y(t_i) C_j \left[ 0.001 \left( \frac{t_i + \Delta - \hat{\tau}_{jk}}{\hat{\tau}_{jk+1} - \hat{\tau}_{jk}} \right) \right] \cos\{\omega_{IF} t_i - [\hat{\phi}_{jk} + \hat{\omega}_{Doppjk}(t_i - \hat{\tau}_{jk})]\} \quad (4)$$

$$Q_{jk}(\Delta) = -\sum_{i=i_k}^{i_k+N_k} y(t_i) C_j \left[ 0.001 \left( \frac{t_i + \Delta - \hat{\tau}_{jk}}{\hat{\tau}_{jk+1} - \hat{\tau}_{jk}} \right) \right] \sin\{\omega_{IF} t_i - [\hat{\phi}_{jk} + \hat{\omega}_{Doppjk}(t_i - \hat{\tau}_{jk})]\} \quad (5)$$

where $i_k$ is the index of the first RF front-end sample time that obeys $\hat{\tau}_{jk} \leq t_{i_k}$ and $N_k+1$ is the total number of samples that obey $\hat{\tau}_{jk} \leq t_i < \hat{\tau}_{jk+1}$. The time offset $\Delta$ causes the replica PRN code to play back early if it is positive and late if $\Delta$ is negative. The prompt correlations are defined by equations (4) and (5) with $\Delta=0$. The early-minus-late correlations are $I_{jk}(\Delta_{eml}/2)-I_{jk}(-\Delta_{eml}/2)$ and $Q_{jk}(\Delta_{eml}/2)-Q_{jk}(-\Delta_{eml}/2)$ where $\Delta_{eml}$ is the spacing between the early and late PRN carrier replicas. The present invention described herein is an efficient technique for the receiver to accumulate $I_{jk}$ and $Q_{jk}$ in software.

Referring now to FIG. 1, the operational platform of the software receiver 10 of the present invention includes an antenna 11, conventional RF front-end 13, a data acquisition (DAQ) system 17, a microprocessor 16, a software correlator 19, and application-specific code 15. Conventional RF front-end 13 interfaces with antenna 11 and with (DAQ) system 17. DAQ system 17 includes a system of shift registers and a data buffer. Microprocessor 16 executes software correlator 19, which includes a set of specially developed bit-wise parallel algorithms, and application-specific code 15, such as the GPS navigation and tracking functions. In the illustrative embodiment, conventional GPS software functions (signal tracking, data extraction, navigation solution, etc.) are provided by the MITEL® GPSArchitect software ported to RTLINUX® (see *A Coming of Age for GPS: A RTLINUX BASED GPS RECEIVER*, Ledvina et al., *Proceedings of the Workshop on Real Time Operating Systems and Applications and Second Real Time Linux Workshop* (*in conjunction with IEEE RTSS* 2000) Nov. 27-28, 2000), but can be provided by any equivalent configuration.

Continuing to refer to FIG. 1, conventional RF front-end 13 can, for example, be a MITEL® GP2015 RF front-end, which down converts the nominal 1.57542 GHz GPS signal 12 to an intermediate frequency of $(88.54/63) \times 10^6$ Hz≈1.4053968254 MHz and then performs analog-to-digital conversion. The resultant, digitized signal data 21 has a pre-determined number of bits/sample, such as two binary bits/sample, a sign bit and a magnitude bit, or one bit/sample. The shift registers in the DAQ system 17 parallelize the magnitude and sign data bit streams into separate words, which the DAQ system 17 reads into the memory of microprocessor 16 using DMA. To make the process of reading data into the microprocessor 16 more efficient and to prepare for efficient correlation calculations, DAQ system 17 can read a pre-specified number of bits of buffered samples, such as thirty-two bits, at a time. The exemplary thirty-two bits include sixteen sign bits and sixteen magnitude bits.

Figure 2A:
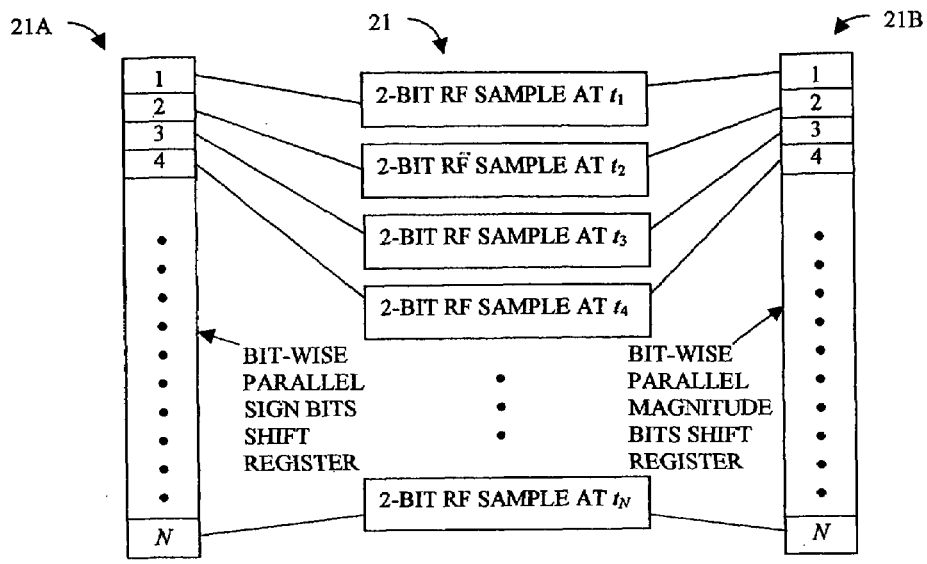
FIGS. 2A and 2B are schematic diagrams of bit-wise mappings of signal and carrier replica sign and magnitude bits to computer data words.

Referring now to FIGS. 1 and 2A, the shift registers in DAQ system 17 (FIG. 1) buffer signal data 21 (FIGS. 1 and 2A) and pack signal sign 21A (FIG. 2A) and signal magnitude 21B (FIG. 2A) into separate words, that represent the integer values ±1 and ±3 as is shown in Table 1. In the case of a 1-bit signal, the bit stream representing the samples is packed into successive words to prepare the signal for bit-wise parallel processing. DAQ system 17 also provides for accurate timing by, for example, synchronizing signal sign 21A and signal magnitude 21B to a $(40/7) \times 10^6$ Hz≈5.714 MHz clock signal, which can be, for example, a third output from conventional RF front-end 13 (FIG. 1). DAQ system 17 can convert the 5.71424 MHz clock signal down to 357.14 KHz by use of, for example, a divide-by-16 counter for a 16-bit word, which can provide a signal indicating when the buffer is full. DAQ system 17 can use any method for providing a buffer full indication.

TABLE 1

The sign and magnitude combinations of the sample RF output of the conventional RF front-end and their corresponding values.

| Signal Sign 21A | Signal Magnitude 21B | RF Signal Value |
|---|---|---|
| 0 | 0 | −1 |
| 0 | 1 | −3 |
| 1 | 0 | +1 |
| 1 | 1 | +3 |

With further reference to FIG. 1, in the illustrative embodiment, the DAQ system 17 can consist of an interface card and driver software that can be compatible with, for example, a 1.73 GHz AMD ATHLON® processor running RTLINUX®, but could be compatible with any operating system and any processor that can accommodate real-time operations. The interface card can, for example, be a NATIONAL INSTRUMENTS® PCI-DIO-32HS digital I/O card. Pertinent features of this card are the thirty-two digital input lines, DMA, and availability of a driver for RTLINUX®, perhaps gotten from the suite of open source drivers and application interface software for interface cards known as COMEDI (COntrol and MEasurement and Device Interface). Modifications to the conventional COMEDI driver for the PCI-DIO-32HS card include increasing the number of input bits from sixteen to thirty-two, enabling DMA, and modifying the driver to support continuous interrupt-driven acquisition.

With still further reference to FIG. 1, microprocessor 16 can be, for example, a 1.73 GHz AMD ATHLON™ processor running the RTLINUX® operating system, but any operating system and processor that can accommodate real-time operations can be used. Low latency interrupt responsiveness, the ability to execute threads at regular intervals, with the kernel having a possibility of being the lowest priority thread, and reliable execution of time-critical code are among features of an operating system that could enhance the performance of the system of the present invention. The use of RTLINUX® is presented herein for illustrative purposes only.

Continuing to refer to FIG. 1, analogous to a hardware correlator that takes input directly from the RF front end in serial fashion, software correlator 19 reads from a shared memory buffer that both software correlator 19 and DAQ system 17 can access, the former to read data, and the latter to write data. The shared memory buffer can be implemented as a DMA memory space and a circular buffer. In the illustrative embodiment in which the system and method of the present invention are used in a GPS (or similar) environment, microprocessor 16 can store the most recent twenty-one milliseconds of signal data 21 (FIGS. 1 and 2A) in the circular buffer, but could store more or less. The present invention does not fix the size of the circular buffer, nor the amount of RF data that can be stored there. The circular buffer allows the processing of code periods that start and stop at different times for different satellites during different iterations of a regularly scheduled program thread. DMA memory space can be written to directly by DAQ system 17 using a DAQ software driver, which fills the circular buffer. Communication between software correlator 19 and application-specific code 15 can be performed using operating system-provided shared memory capability. For example, the mbuff driver, included with RTLINUX®, can be used to create and manage this shared memory space. Any memory management system that accommodates real-time processing can be used. If the mbuff driver is used, kernel modules can share memory and the kernel can be restricted from swapping the shared memory space to long-term storage.

Figure 3A:
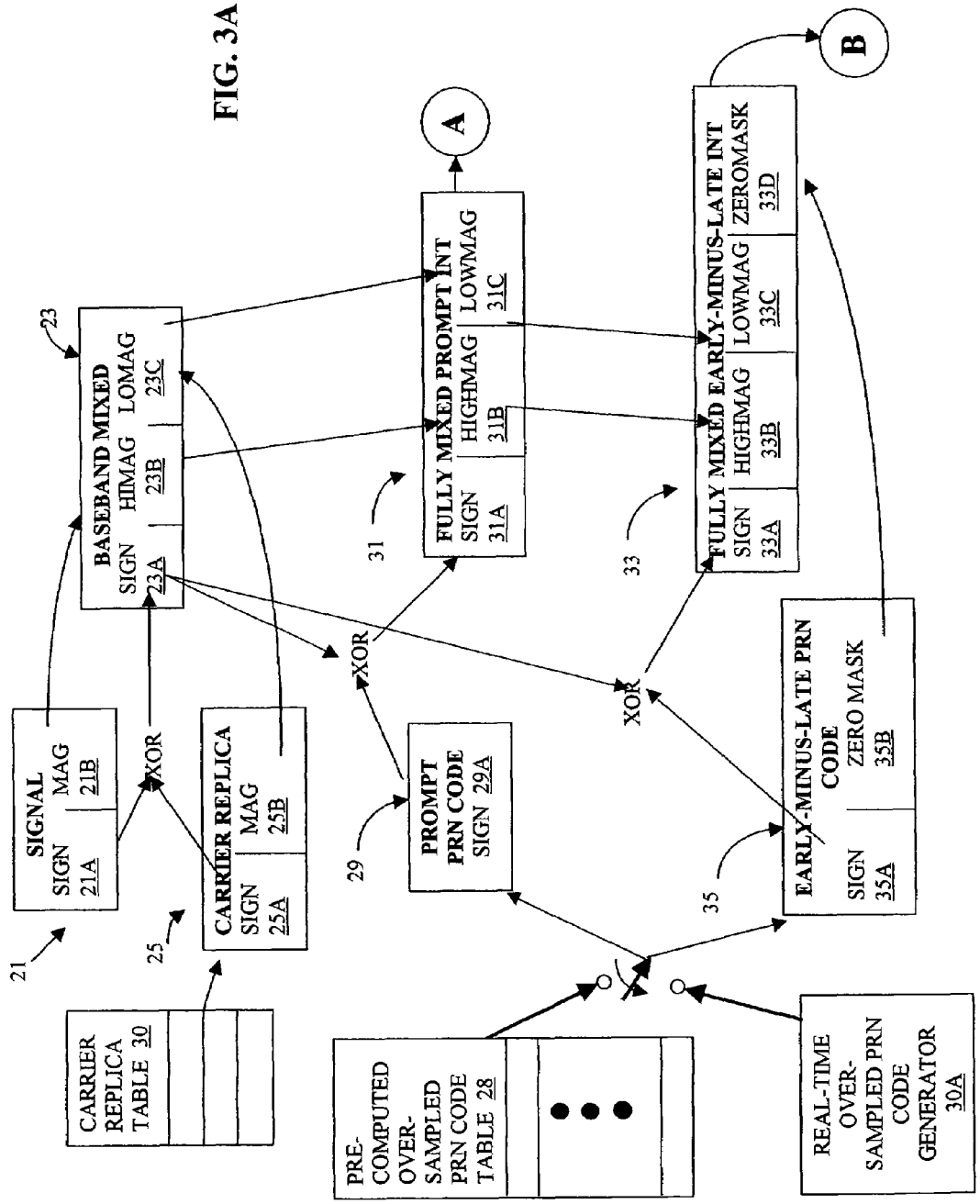
FIGS. 3A and 3B are data flow diagrams illustrating the bit-wise parallelism process (replicated twice, once for the in-phase carrier replica and once for the quadrature carrier replica) of the present invention.

Continuing with the analogy to hardware correlation, and still referring primarily to FIG. 1, in hardware correlation, the correlator receives frequency and phase information from tracking and acquisition loops that are part of application code, and Numerically Controlled Oscillators (NCOs) generate signals that correspond to the written frequencies and phases. In contrast, software correlator 19 includes simulated carrier and code NCOs that receive their frequency commands from application-specific code 15. Software correlator 19 uses these frequency commands to reconstruct carrier replica signal 25 (FIG. 3A) and prompt PRN code 29 and early-minus-late PRN code 35 (FIG. 3A) which it mixes with the signal data 21 (FIG. 2A) resulting in fully mixed prompt integrand 31 and fully mixed early-minus-late integrand 33 (FIG. 3A).

To further continue the analogy, a hardware correlator generates in real-time a particular C/A code replica at the correct Doppler shifted frequency and phase. In contrast, software correlator 19 can generate C/A codes off-line and store them in a memory table, the pre-computed over-sampled PRN code table 28 (FIG. 3A). The pre-computed over-sampled PRN code table 28 is used to select PRN codes with the correct timing relationship to the sample times of signal data 21 (FIG. 3A). The codes are then used to form correlations with baseband mixed signals 23 (FIG. 3A), the result from which is summed to produce the standard in-phase and quadrature, summed prompt accumulation 45 (FIG. 3B) and summed early-minus-late accumulation 47 (FIG. 3B) that are equivalent to what would be produced by a continuously variable sine wave. These are provided to application-specific code 15, such as conventional GPS software that executes signal tracking and navigation functions. In a second approach, software correlator 19 can generate the PRN carrier replicas on-line at the code chipping rate and can use tabulated functions to re-sample the code at the sample rate of the RF front-end for purposes of calculating accumulations. Real-time over-sampled PRN code generator 30A (FIG. 3A) is used in place of pre-computed over-sampled PRN code table 28 (FIG. 3A) in this latter approach. This latter method can be used with longer PRN codes, such as the new civilian GPS L2 CL codes.

With still further reference to FIG. 1, since the received L1 raw signal 12 can have an uncertain carrier phase, software correlator 19 computes both in-phase (I) and quadrature (Q) accumulations, as defined in equations (4) and (5). Software correlator 19 begins the accumulation process by using carrier replica signal 25 (FIG. 3A), which it gets from pre-stored carrier replica table 30 (FIG. 3A). The carrier replicas in this table fall on a rough frequency grid, and they all start with a particular phase, for example a phase of zero. The baseband mixing process involves selecting a carrier replica signal 25 (FIG. 3A) from carrier replica table 30 (FIG. 3A) that is at the frequency that is as close to "ideal" as possible. In the case of a 175 Hz grid spacing, the baseband mixing process selects a signal that is maximally within ±87.5 Hz of the ideal signal. The rough frequency grid can have a spacing of, for example, 175 Hz but could be larger or smaller depending on (a) the frequency range needed to cover, for example, ±10 Khz, (b) the amount of space available for storing pre-computed signals, and (c) other design decisions. The pre-computed signals in carrier replica table 30 (FIG. 3A) each may occupy 180 32-bit words in order to be guaranteed to cover the full 5,714 RF front-end samples that occur in one PRN code period for any possible code period start time within the thirty-two samples of the initial word. Thus, 180*4=720 bytes could be required for each bit of each pre-computed carrier replica signal 25 that is stored in the table. The sine and cosine waves of carrier replica signals 25 (FIG. 3A) each have 2-bit representations, which translates into a storage requirement of 2880 bytes for the carrier replica signals 25 at a given Doppler shift. There are 115 Doppler shifts that may be stored in order to cover the −10 KHz to +10 KHz range with a 175 Hz grid spacing. This translates into 323 Kbytes of storage for all of the carrier replica signals 25. This approach avoids the need to pre-compute sine waves with a prohibitively large number of possible frequencies and phase offsets and it avoids the need to compute sine waves in real-time. Instead, the errors created by using pre-defined sine wave replicas are compensated for by post-processing calculations, as described below.

In any case, and continuing to refer to FIG. 1, the resulting accumulations are $$I_{gjk}(\Delta) = \sum_{i=i_k}^{i_k+N_k} y(t_i) C_j \left[ 0.001 \left( \frac{t_i + \Delta - \hat{\tau}_{jk}}{\hat{\tau}_{jk+1} - \hat{\tau}_{jk}} \right) \right] \cos[(\omega_{IF} - \omega_{gjk})(t_i - t_{0gjk})] \quad (6)$$

-continued $$Q_{gjk}(\Delta) = \tag{7}$$

$$-\sum_{i=i_k}^{i_k+N_k} y(t_i)C_j\left[0.001\left(\frac{t_i+\Delta-\hat{\tau}_{jk}}{\hat{\tau}_{jk+1}-\hat{\tau}_{jk}}\right)\right]\sin[(\omega_{IF}-\omega_{gjk})(t_i-t_{0gjk})]$$

where $\omega_{gjk}$ is the grid frequency that is closest to the estimated frequency $\hat{\omega}_{Doppjk}$ and where $t_{0gjk}$ is the time at which this carrier replica signal 25 (FIG. 3A) has zero carrier phase. Software correlator 19 rotates these accumulations in order to create accurate approximations of what would have been computed had the estimated carrier phase time history in equations (4) and (5) been used:

$$I_{jk}(\Delta)=I_{gjk}(\Delta)\cos(\Delta\phi_{avgjk})+Q_{gjk}(\Delta)\sin(\Delta\phi_{avgjk}) \tag{8}$$

$$Q_{jk}(\Delta)=-I_{gjk}(\Delta)\sin(\Delta\phi_{avgjk})+Q_{gjk}(\Delta)\cos(\Delta\phi_{avgjk}) \tag{9}$$

where $\Delta\phi_{avgjk}$ is the average phase difference between the grid carrier phase and the estimated carrier phase averaged over the accumulation interval:

$$\Delta\phi_{avgjk} = \tag{10}$$

$$\omega_{gjk}\left(\frac{\hat{\tau}_{jk}+\hat{\tau}_{jk+1}}{2}-t_{0gjk}\right)-\hat{\phi}_{jk}-\hat{\omega}_{Doppjk}\left(\frac{\hat{\tau}_{jk+1}-\hat{\tau}_{jk}}{2}\right)+\omega_{IF}t_{0gjk}$$

Note that equations (8), (9), and (10) are an illustrative example of how software correlator (19) can rotate its I and Q accumulations in order to correct for phase and frequency errors in its table of pre-computed carrier replica signals. There exist other formulas that yield equivalent results, and this patent disclosure covers all such techniques.

The validity of equations (8) and (9) is dependent on the assumption that $$1-\cos\left[\frac{1}{2}(\omega_{gjk}-\hat{\omega}_{Doppjk})(\hat{\tau}_{jk+1}-\hat{\tau}_{jk})\right] \ll 1 \tag{11}$$

For example, a 175 Hz grid spacing and a nominal C/A PRN code period of 0.001 sec yields a value on the left-hand side of inequality (11) of 0.04, which respects the assumed limit.

Note that equations (8) and (9) can be derived from equations (4) and (5) as follows. First, the carrier phase of the grid signal in the arguments of the cosine and sine terms of equations (6) and (7) are added to and subtracted from the arguments of the cosine and sine terms in equations (4) and (5). Next, trigonometric identities are used to split the resulting cosine and sine terms into sums of products of cosine and sine functions. In each product, one of the terms involves an argument like the arguments in the trigonometric terms in equations (6) and (7). The other trigonometr terms are then approximated by either $\cos(\Delta\phi_{avgjk})$ or $\sin(\Delta\phi_{avgjk})$. These approximations are valid because of the inequality in equation (11) and because the average of $$\sin\left\{(\omega_{gjk}-\hat{\omega}_{Doppjk})\left[t_i-\frac{1}{2}(\hat{\tau}_{jk}+\hat{\tau}_{jk+1})\right]\right\}$$

over the accumulation interval is zero.

A decrease in the carrier to noise ratio $C/N_0$, which characterizes the receiver's sensitivity, is caused by the use of an inexact baseband mixing frequency. The worst-case decrease is expressed as a function of the frequency grid spacing $\Delta f$ and is given by $$\Delta SNR = 20\log_{10}\left(\frac{\sin(\pi\Delta fT)}{\pi\Delta fT}\right) \tag{12}$$

where $\Delta f$ is in units of Hz, and T is the integration period. Thus, a $\Delta f$ of 175 Hz causes a worst-case $C/N_0$ loss of 0.11 dB for T=0.001 sec.

Figure 2B:
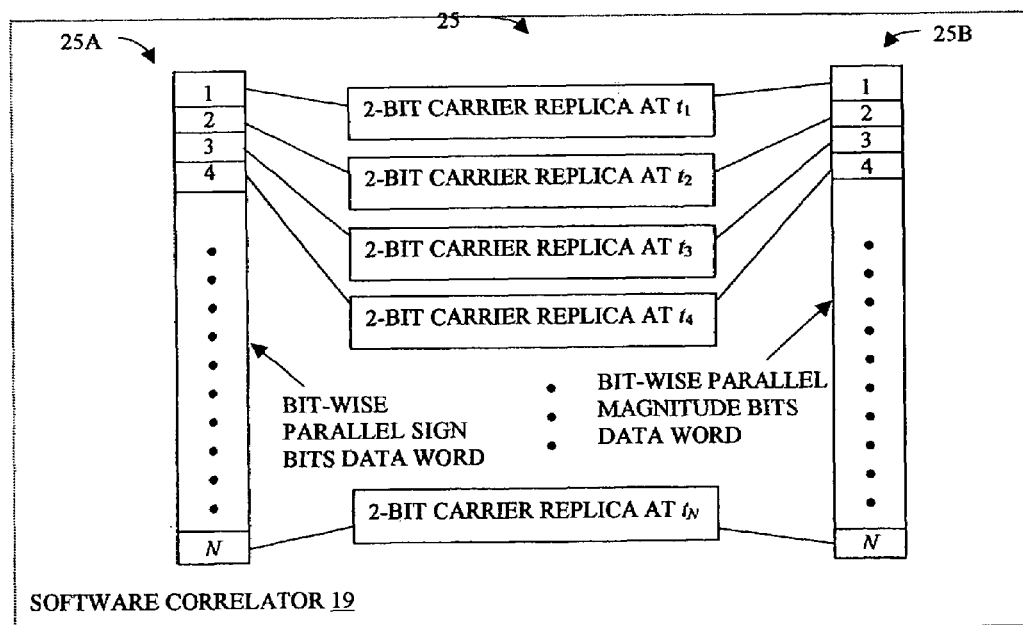

Referring now to FIGS. 2A, 2B, and 3A, PRN codes (composed of prompt PRN codes 29 (FIG. 3A) and early-minus-late PRN codes 35 (FIG. 3A)) are either pre-computed or generated in real-time. Pre-computing involves, for each satellite, computing an entire PRN code, storing the PRN code appropriately for easy retrieval, and referencing the PRN code, possibly by means of indices that are computed based on, for example, the incoming RF signal data 21 (FIGS. 2A and 3A). Pre-computing can be most advantageously used when the PRN code is not very long. Generating PRN codes in real-time can be a more appropriate solution when the PRN codes are very long (and thus would require an unacceptable amount of storage), or perhaps when too many PRN codes are required for the amount of storage available, or for any other reason, but real-time PRN code generation can entail an additional computational cost. Both pre-computing and real-time determination of PRN codes are described herein with respect to a bit-wise parallel implementation.

Continuing to refer primarily to FIGS. 2A, 2B, and 3A, in order to perform bit-wise parallel operations, software correlator 19 (FIG. 1) stores pre-computed carrier replica sign 25A (FIGS. 2B and 3A) and carrier replica magnitude 25B (FIGS. 2B and 3A) in data words. Simple representations of signal data 21 (FIGS. 2A and 3A) and carrier replica signal 25 (FIGS. 2B and 3A) in terms of one, two, or more bits are suitable for using bit-wise parallelism to perform the calculations described herein. Bit-wise parallel operations work with representations of the data that store successive samples in successive bits of a word. For example, thirty-two samples (bits) of the RF front-end output are stored in two N=32-bit words, signal sign 21A (FIGS. 2A and 3A) and signal magnitude 21B (FIGS. 2A and 3A), or simply a single 32-bit word if signal data 21 consists of a single data bit. Carrier replica sign 25A (FIGS. 2B and 3A) and carrier replica magnitude 25B (FIGS. 2B and 3A) are stored, for example in tables, in separate words, with each 32-bit word storing thirty-two sign or magnitude bits that tabulate to thirty-two successive samples of the corresponding cosine or sine wave. Similarly, tables can store prompt PRN code 29 (FIG. 3A) and early-minus-late PRN code 35 (FIG. 3A), which are composed of prompt PRN code sign 29A (FIG. 3A), early-minus-late PRN code sign 35A (FIG. 3A), and early-minus-late PRN code zero mask 35B (FIG. 3A). The data words that comprise the bit-wise parallel representations of these three signal types, the original RF signal data 21 (FIGS. 2A and 3A), the carrier replica signal 25 (FIG. 2B and FIG. 3A), and the de-spreading prompt PRN code 29 (FIG. 3A) and early-minus-late PRN code 35 (FIG. 3A), are the inputs to the calculations of software correlator 19 (FIG. 1).

Figure 3B:
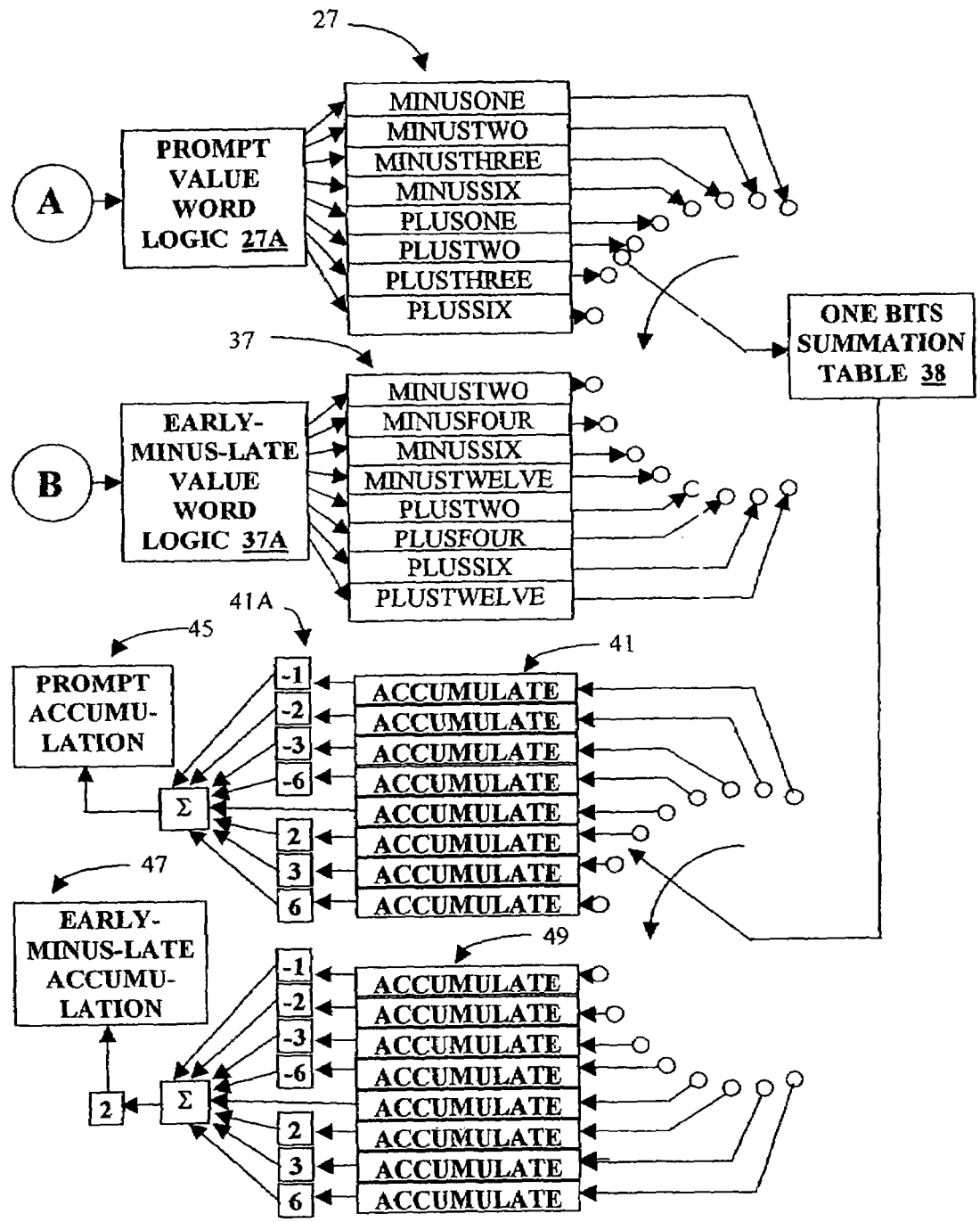

Further continuing primarily to refer to FIGS. 2A, 2B, and 3A, many intermediate calculated quantities and at least three types of intermediate signals are also stored in bit-wise parallel format. First there are the in-phase and quadrature baseband mixed signals 23 (FIG. 3A), whose 3-bit representations for the illustrative embodiment are stored as baseband mixed sign 23A (FIG. 3A), baseband mixed high magnitude 23B (FIG. 3A), and baseband mixed low magnitude 23C (FIG. 3A). The second bit-wise parallel signal type is the fully mixed integrand, of which there are four signals: in-phase and quadrature fully mixed prompt integrand 31 (FIG. 3A) and in-phase and quadrature fully mixed early-minus-late integrand 33 (FIG. 3A). The former are stored as 3-bit representations in the illustrative embodiment as fully mixed prompt integrand sign 31A (FIG. 3A), fully mixed prompt integrand high magnitude 31B (FIG. 3A), and fully mixed prompt integrand low magnitude 31C (FIG. 3A). The latter are stored as 3.5-bit representations in the illustrative embodiment as fully mixed early-minus-late integrand sign 33A (FIG. 3A), fully mixed early-minus-late integrand high magnitude 33B (FIG. 3A), fully mixed early-minus-late integrand low magnitude 33C (FIG. 3A), and fully mixed early-minus-late integrand zero mask 33D (FIG. 3A). This representation is called a 3.5-bit representation because the sign, high-magnitude, and low-magnitude bits are ignored if the corresponding zero mask bit has the value zero. The third bit-wise parallel signal type is a value word, of which there are two types: prompt integrand value words 27 (FIG. 3B) and early-minus-late integrand value words 37 (FIG. 3B). Each fully mixed integrand is used to construct value words, one word for each possible value that the integer integrand can take on. There are eight possible values for the integrands of the illustrative embodiment: −1, −2, −3, −6, 1, 2, 3, and 6 for the in-phase and quadrature fully mixed prompt integrands 31 (FIG. 3A) and −2, −4, −6, −12, 2, 4, 6, and 12 for the in-phase and quadrature fully mixed early-minus-late integrands 33 (FIG. 3A). Each bit-wise parallel value word contains a one bit for each sample time when the integrand value equals the value of the value word, but it contains a zero bit for all other sample times. The storage of raw data and intermediate results in bit-wise parallel format allows the EXCLUSIVE OR operations that are involved in mixing to operate on thirty-two samples at a time if microprocessor 16 (FIG. 1) has a bit-wise EXCLUSIVE OR command. Other bit-wise commands are used to perform additional software correlation operations in parallel on sets of two thirty-two samples.

Figure 2D:
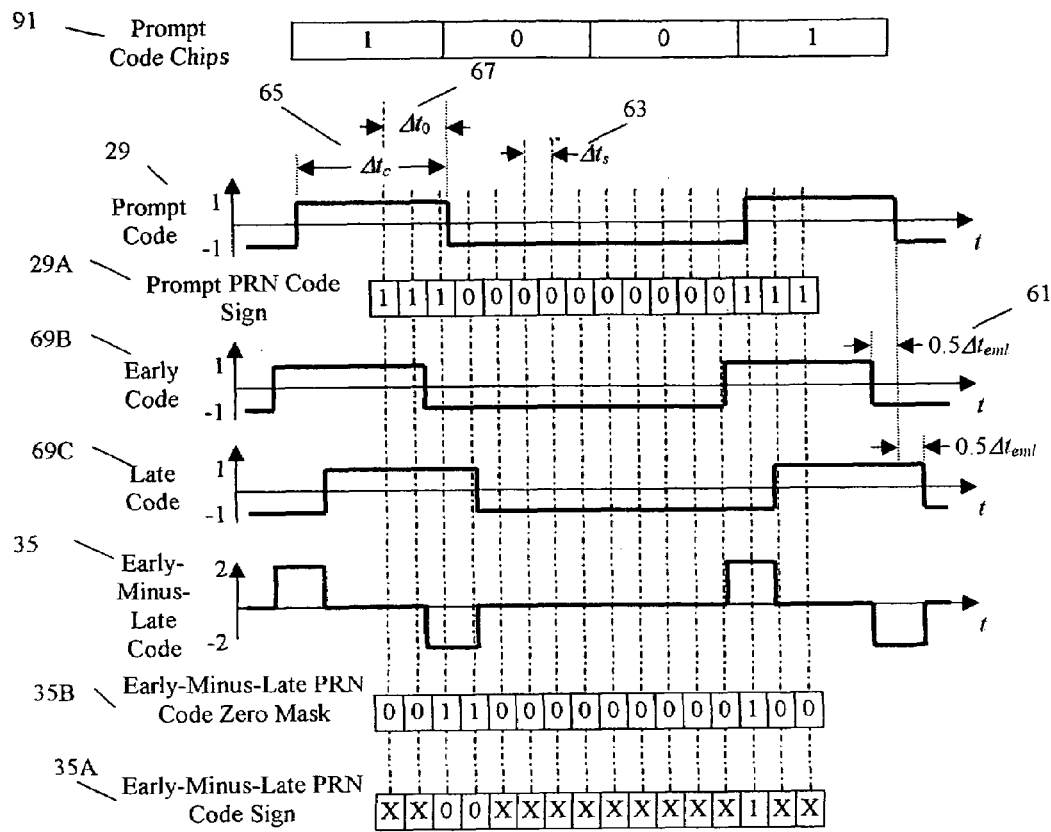
FIG. 2D is a graphic representation of a plot of sections of prompt, early, late, and early-minus-late PRN code signals and 16-bit word representations of their over-sampled equivalents.

At this point, the problem of over-sampling is introduced. Referring now to FIGS. 2C and 2D, the problem of over-sampling is illustrated with respect to bit-wise parallelism as follows. There is normally more than one RF data sample per PRN code chip. The three successive −1 values 73 (FIG. 2C) at sample times $t_1$ to $t_3$ all occur during the same PRN code chip as do the four successive +1 values 75 (FIG. 2C) at times $t_4$ through $t_7$. The difference in the number of samples for the two code chips arises because the PRN code chip period is not an integer multiple of the sample period. Analogously, referring to FIG. 2D, where sample interval $\Delta t_s$ 63 is less than actual PRN code chip length $\Delta t_c$ 65, over-sampling is indicated because the RF sampling frequency $f_s=1/\Delta t_s$ is greater than the PRN code chipping frequency $f_c=1/\Delta t_c$. PRN codes for CDMA signaling are sequences of +1 and −1 values, the elements of which are chips. Over the time intervals of interest, a carrier replica progresses through its chips at a constant chipping rate of $f=1/\Delta t_c$ chips/second. The time interval $\Delta t_c$ is the actual PRN code chip length 65 (FIG. 2D). Software correlator 19 (FIG. 1) normally receives PRN code, and attempts to align it with the prompt replica version of the code, prompt PRN code 29 (FIG. 2D). It makes use of the signal's correlation with prompt PRN code 29 (FIG. 2D) and with early-minus-late PRN code 35 (FIG. 2D) in order to determine a chipping rate $f_c$ that tends to align prompt PRN code 29 (FIG. 2D) as desired. Conventional methods for determining $f_c$ are well-known in the art. Chips of early code 69B (FIG. 2D) start and stop $0.5\Delta t_{eml}$ seconds before the corresponding chips of prompt PRN code 29 (FIG. 2D), and the chips of late code 69C (FIG. 2D) start and stop $0.5\Delta t_{eml}$ seconds after prompt PRN code 29 (FIG. 2D). Early-minus-late PRN code 35 (FIG. 2D) is the difference between early code 69B (FIG. 2D) and late code 69C (FIG. 2D). Example segments of these four types of replica codes are depicted in FIG. 2D.

Referring to FIGS. 1, 2A, 2C, and 2D software correlator 19 (FIG. 1) receives, through conventional RF front end 13 and DAQ system 17, signal data 21 (FIG. 1), the raw data 12 (FIG. 1) source of which is sampled at the rate $f_s=1/\Delta t_s$ Hz. In order to process the resulting RF signal data 21, software correlator 19 (FIG. 1) needs prompt PRN code 29 (FIG. 2D) and early-minus-late PRN code 35 (FIG. 2D) replicas sampled at the same times as raw signal 12 (FIG. 1). FIG. 2D depicts sixteen sample times as vertical dash-dotted lines. Referring to FIG. 2D, prompt PRN code 29 (FIG. 2D) can be represented by its prompt PRN code sign 29A (FIG. 2D) at the sample times. The bit value one represents +1, and the bit value zero represents −1. Prompt PRN code sign 29A (FIG. 2D), shown at the sixteen sample times—starting with three 1s, continuing with ten 0s, and finishing with another three 1s—is a 16-bit word stored as the integer $2^{15}+2^{14}+2^{13}+2^2+2^1+2^0=57351$. Early-minus-late PRN code 35 (FIG. 2D) requires a 1.5-bit representation. A zero mask bit is set to zero if early-minus-late PRN code 35 takes on the value zero, and it is set to one if early-minus-late PRN code 35 equals +2 or −2. Early-minus-late PRN code zero mask 35B (FIG. 2D) at sixteen sample times shown in FIG. 2D is equivalent to $2^{13}+2^{12}+2^2=12292$. A 2's sign bit is set to one if early-minus-late PRN code 35 (FIG. 2D) equals +2 at the sample time, and it is set to zero if the code equals −2. The 2's sign bit is irrelevant if the corresponding early-minus-late PRN code zero mask 35B (FIG. 2D) bit equals zero. Early-minus-late PRN code sign 35A (FIG. 2D) for sixteen sample times contains X values that indicate bits whose values are irrelevant because the corresponding early-minus-late PRN code zero mask 35B (FIG. 2D) bits are zero. In an illustrative embodiment, all the X values become zero, thus the equivalent integer for early-minus-late PRN code sign 35A (FIG. 2D) is $2^2=4$.

Continuing to refer to FIG. 3A, an alternative to taking the prompt PRN code 29 and early-minus-late PRN code 35 from pre-computed over-sampled PRN code table 28 is to generate prompt PRN code sign 29A, early-minus-late PRN code sign 35A, and early-minus-late PRN code zero mask 35B using real-time over-sampled PRN code generator 30A (FIG. 3A). Shown in FIG. 3A are two circles and a loose arrow with a quarter circle pointer. These are the symbols for a switch and indicate the ability of the system to choose possible alternate sources of PRN code. Using the real-time over-sampled PRN code generator 30A includes a step of generating the PRN code chips in real-time by conventional means. For example, the GPS civilian L2 CL and CM codes are generated by a 27-bit feedback shift register (see *The New L2 Civil Signal*, R. D. Fontana et al., *Proceedings of the*

ION GPS 2001, Sep. 11-14, 2001, Salt Lake City, Utah, pp. 617-631). The method further includes the steps of choosing chip values from the PRN code, where the chip values correspond to a data interval that contains the samples of a data word and where the chips have a known timing relative to the data interval, transforming the relative timing into a time grid index, and translating the PRN code chip values and the time grid index for the data interval into the PRN code's over-sampled bit-wise parallel format. These latter steps can be carried out efficiently by using a table look up function. One table each for prompt PRN code sign 29A, early-minus-late PRN code sign 35A, and early-minus-late PRN code zero mask 35B can include integer values that constitute the bit-wise parallel representation of the PRN code for the sample times associated with the data word in question. Indices into each 1-dimensional table are functions of (a) the time offset between the first PRN code chip and the first sample time of the given data word, and (b) the bit pattern of the PRN code chips that span the sample times of the data word. The sizes of the tables are independent of the period of the PRN code that is being over-sampled. The tables can be re-used for multiple PRN codes in a multi-channel receiver. The computation and use of the tables are discussed in more detail later.

Figure 3C:
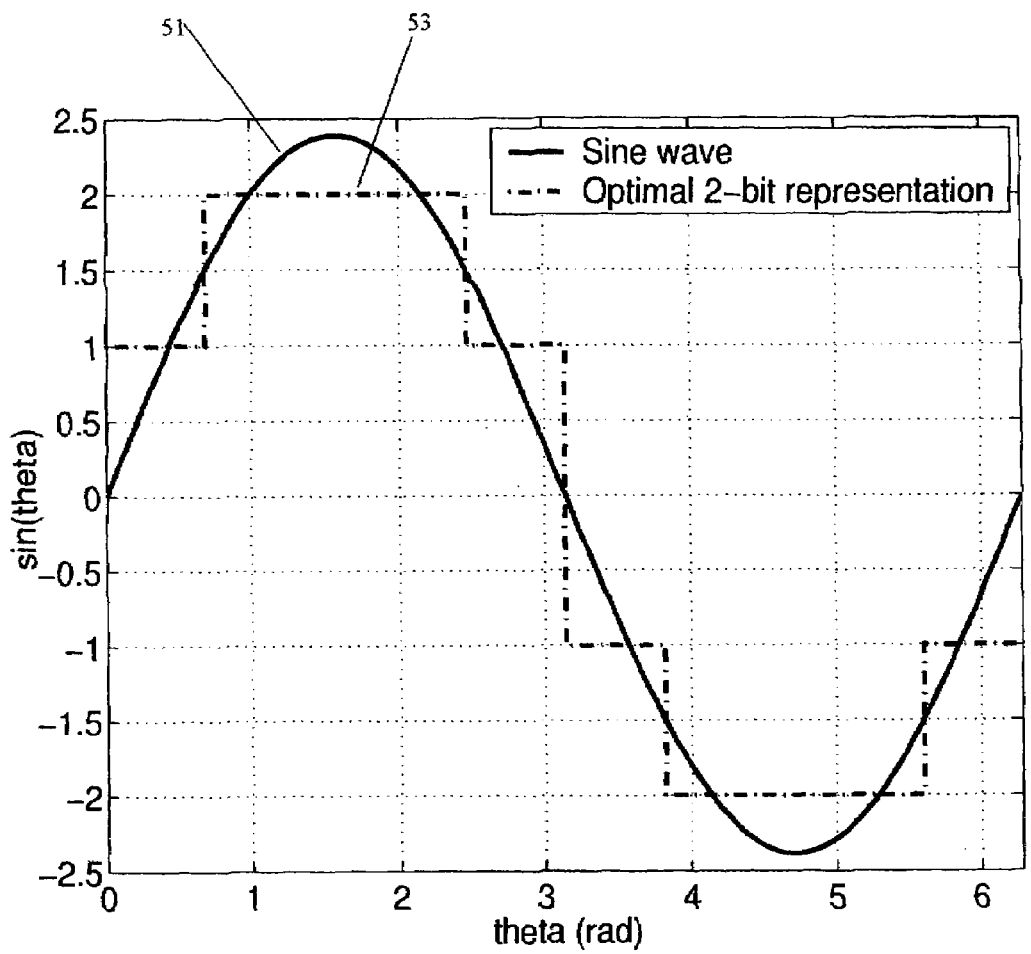
FIG. 3C is a graphic representation of a plot of a prior art optimal 2-bit representation of a sine wave presented to enhance the reader's understanding of the present invention.

Continuing with the description of bit-wise parallelism with respect to the operations of software correlator 19 (FIG. 1), and continuing to refer to FIG. 3A, the specially-developed algorithms described herein make use of bit-wise parallelism so that a single programming language statement, such as a C code command, can partially process up to thirty-two samples at a time. Previously referred-to carrier replica signal 25 in the form of cosine and sine signals are stored as binary carrier replica sign 25A and carrier replica magnitude 25B. The format of this representation is defined in Table 2 and illustrated in FIG. 3C which is a reconstructed carrier and carrier replica in the form of representative sine signal 51 (FIG. 3C) shown in optimal 2-bit representation 53 (FIG. 3C) that has the minimum square error. The format of Table 2 assumes that the cosine and sine signals have an amplitude of approximately 2.4. Note that other representations, beyond 2-bit representation, are possible. In general, more bits yield a better SNR, but can also require a larger number of computations for the correlation operations.

TABLE 2

Sign and magnitude combinations of the stored intermediate-frequency baseband mixing carrier sine wave replicas and the values that they represent

| Carrier Replica Sign 25A | Carrier Replica Magnitude 25B | Carrier Replica Value |
|---|---|---|
| 0 | 0 | −1 |
| 0 | 1 | −2 |
| 1 | 0 | +1 |
| 1 | 1 | +2 |

Continuing to refer to FIG. 3A, multiplication of the RF front-end output representation, the signal sign 21A and signal magnitude 21B, of Table 1 by the sine wave representation, carrier replica sign 25A and carrier replica magnitude 25B, of Table 2 yields baseband mixed signals 23, consisting of baseband mixed sign 23A, baseband mixed high magnitude 23B, and baseband mixed low magnitude 23C, that can take on the values −6, −3, −2, −1, +1, +2, +3, and +6, as shown in Table 3. Baseband mixed high magnitude 23B is simply signal magnitude 21B, and baseband mixed low magnitude 23C is carrier replica magnitude 25B. Thus, these two magnitude bits are available without the need for computation. Baseband mixed sign 23A is the result of an EXCLUSIVE OR operation between signal sign 21A and carrier replica sign 25A. Notice how the relationship of the sign bit value with the actual sign gets reversed from that of Tables 1 and 2.

TABLE 3

Sign, high-magnitude, and low-magnitude combinations of the baseband-mixed signal and their corresponding signal values.

| Baseband Mixed Sign 23A | Baseband Mixed High Magnitude 23B | Baseband Mixed Low Magnitude 23C | Baseband Mixed Value |
|---|---|---|---|
| 0 | 0 | 0 | +1 |
| 0 | 0 | 1 | +2 |
| 0 | 1 | 0 | +3 |
| 0 | 1 | 1 | +6 |
| 1 | 0 | 0 | −1 |
| 1 | 0 | 1 | −2 |
| 1 | 1 | 0 | −3 |
| 1 | 1 | 1 | −6 |

Continuing to refer to FIG. 3A, and continuing to describe the bit-wise parallel algorithms, the required amount of storage for tables of pre-computed prompt PRN code 29 and early-minus-late PRN code 35 can be greatly reduced by making two simplifications. First, the prompt PRN code 29 is stored as prompt PRN code sign 29A. This representation is shown in Table 4. The early-minus-late PRN code 35, on the other hand, is stored in a two-bit representation (actually a 1.5 bit representation): early-minus-late PRN code sign 35A and early-minus-late PRN code zero mask 35B, as denoted in Table 5. Note that the X in the first column of Table 5 indicates that zero or one can be placed in this location without affecting the corresponding code value. The X signifies a lack of effect of the sign bit on the code value when the zero mask bit equals zero. This is why the early-minus-late PRN code 35 representation is referred to as a 1.5-bit representation. This X value will affect the corresponding fully mixed early-minus-late integrand sign 33A, but it will not affect any of the early-minus-late value words because the zero value in the corresponding zero mask location will null out the corresponding bit of all early-minus-late value words.

TABLE 4

Sign bits of the prompt C/A code and the corresponding prompt signal values.

| Prompt PRN Code Sign 29A | Prompt Code Value |
|---|---|
| 1 | +1 |
| 0 | −1 |

TABLE 5

Sign and zero mask bit combinations of the early-minus-late PRN code 35 and the corresponding signal values.

| Early-minus-late PRN Code Sign 35A | Early-minus-late PRN Code Zero Mask 35B | Early-Minus-Late Code Value |
|---|---|---|
| X | 0 | 0 |
| 0 | 1 | −2 |
| 1 | 1 | +2 |

Figure 6:
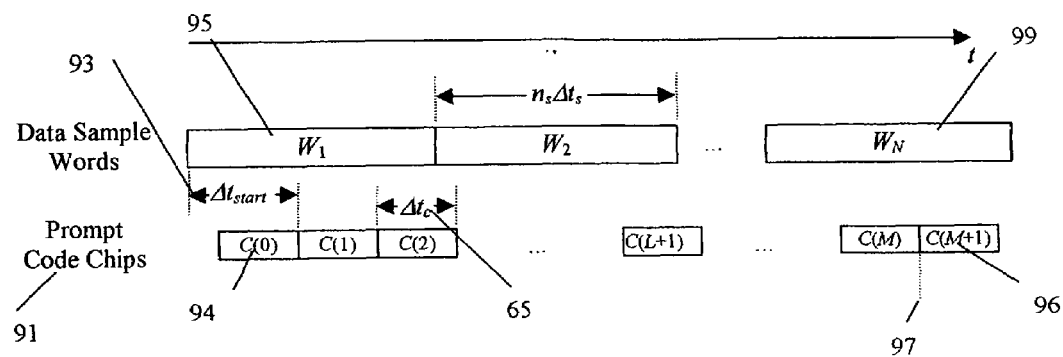
FIG. 6 is a graphic representation of a plot illustrating the timing relationship between data sample words and the sequence of prompt code chips that defines an accumulation interval.

Another simplification in the pre-computed over-sampled PRN code table 28, and continuing to refer to FIG. 3A, can be to ignore code Doppler shift variations. All signals in the table are assumed to have zero Doppler shift; i.e., all C/A codes in the table assume that $\hat{\tau}_{jk+1} - \hat{\tau}_{jk} = 0.001$ sec. Note that the period of 0.001 is applicable for accumulations that use the full 1023 chips of the C/A code only. Any other type of code or accumulation interval may have a different period. The code phase errors due to this assumption can be eliminated by choosing a replica code from the pre-computed over-sampled PRN code table 28 whose midpoint occurs at the desired midpoint time $(\hat{\tau}_{jk} + \hat{\tau}_{jk+1})/2$. The only other effect of this assumption can be a small correlation power loss, which is no more than 0.014 dB if the magnitude of the Doppler shift is less than 10 KHz. The pre-computed over-sampled PRN code table 28 should include a selection of different phases, for example fourteen, as measured relative to a signal sample spacing of, for example, 175 nsec. This translates into a code phase spacing of, for example, 12.5 nsec, which equals a pseudo range measurement digitization level of 3.8 m, or a maximum measurement error of 1.9 m. The number of phases in the pre-computed over-sampled PRN code table 28 is dependent upon the design of the system and no set number of phases is required by the present invention. Referring to FIG. 6, suppose that pre-computed over-sampled PRN code table 28 stores over-sampled bit-wise parallel representations of chips C(1) through C(M). The table must allow for the retrieval of over-sampled bit-wise parallel code replicas for a range of start times of code chip C(1) that span the entire first data sample word in the accumulation interval $W_1$ 95 (FIG. 6). The table may contain code replicas whose different phases yield start times that span only a single sample interval of data word $W_1$ 95 (FIG. 6), which is only $1/n_s$ of the required number of start times. In this case the software correlator may apply bit shift operations to a tabulated PRN code replica from that sample interval in order to generate the over-sampled bit-wise parallel PRN code replica that applies when chip C(1) starts in a different sample interval of data word $W_1$ 95 (FIG. 6).

Continuing to refer to FIG. 3A, and further continuing to describe the bit-wise parallel algorithms, prompt PRN code 29 and early-minus-late PRN code 35 replicas can be mixed with the baseband mixed signals 23 to form fully mixed prompt integrand 31 by an EXCLUSIVE OR operation and bit re-definitions. An EXCLUSIVE OR between prompt PRN code sign 29A and baseband mixed sign 23A produces fully mixed prompt integrand sign 31A given in Table 6. The fully mixed prompt integrand high magnitude 31B and fully mixed prompt integrand low magnitude 31C are baseband mixed high magnitude 23B and baseband mixed low magnitude 23C, also given in Table 6. Note that the Table 6 representation is identical to that of Table 3 except for the inversion in the meaning of the sign bits. The number of magnitude bits is dependent upon the design of the system and no set number of magnitude bits is required by the present invention. A change in the number of magnitude bits will cause a change in the number of entries of the equivalent of Table 6 and it will affect the possible values of the integrand.

TABLE 6

Sign, high-magnitude, and low-magnitude bit combinations of the fully mixed prompt integrand 31 and its corresponding values.

| Fully Mixed Prompt Integrand Sign 31A | Fully Mixed Prompt Integrand High Magnitude 31B | Fully Mixed Prompt Integrand Low Magnitude 31C | Fully Mixed Prompt Integrand Value |
|---|---|---|---|
| 0 | 0 | 0 | −1 |
| 0 | 0 | 1 | −2 |
| 0 | 1 | 0 | −3 |
| 0 | 1 | 1 | −6 |
| 1 | 0 | 0 | +1 |
| 1 | 0 | 1 | +2 |
| 1 | 1 | 0 | +3 |
| 1 | 1 | 1 | +6 |

Still continuing to refer to FIG. 3A, the mixing of the early-minus-late PRN code 35 with the baseband mixed signals 23 forms fully mixed early-minus-late integrands 33. Fully mixed early-minus-late integrand sign 33A is an EXCLUSIVE OR between early-minus-late PRN code sign 35A and baseband mixed sign 23A. Fully mixed early-minus-late integrand high magnitude 33B and fully mixed early-minus-late integrand low magnitude 33C are, as above, baseband mixed high magnitude 23B and baseband mixed low magnitude 23C. Fully mixed early-minus-late integrand zero mask 33D is early-minus-late PRN code zero mask 35B. The resulting representation is given in Table 7. As in Table 5, each X entry in the table indicates that the corresponding bit can be either zero or one without affecting the corresponding integrand value.

TABLE 7

Sign, high-magnitude, low-magnitude, and zero mask bit combinations of the fully mixed early-minus-late integrands 33 and their corresponding values.

| Early-Minus-Late (EML) Integrand Sign 33A | EML Integrand High Magnitude 33B | EML Integrand Low Magnitude 33C | EML Integrand Zero Mask 33D | Early-Minus-Late Integrand Value |
|---|---|---|---|---|
| X | X | X | 0 | 0 |
| 0 | 0 | 0 | 1 | −2 |
| 0 | 0 | 1 | 1 | −4 |
| 0 | 1 | 0 | 1 | −6 |
| 0 | 1 | 1 | 1 | −12 |
| 1 | 0 | 0 | 1 | +2 |
| 1 | 0 | 1 | 1 | +4 |
| 1 | 1 | 0 | 1 | +6 |
| 1 | 1 | 1 | 1 | +12 |

Figure 4A:
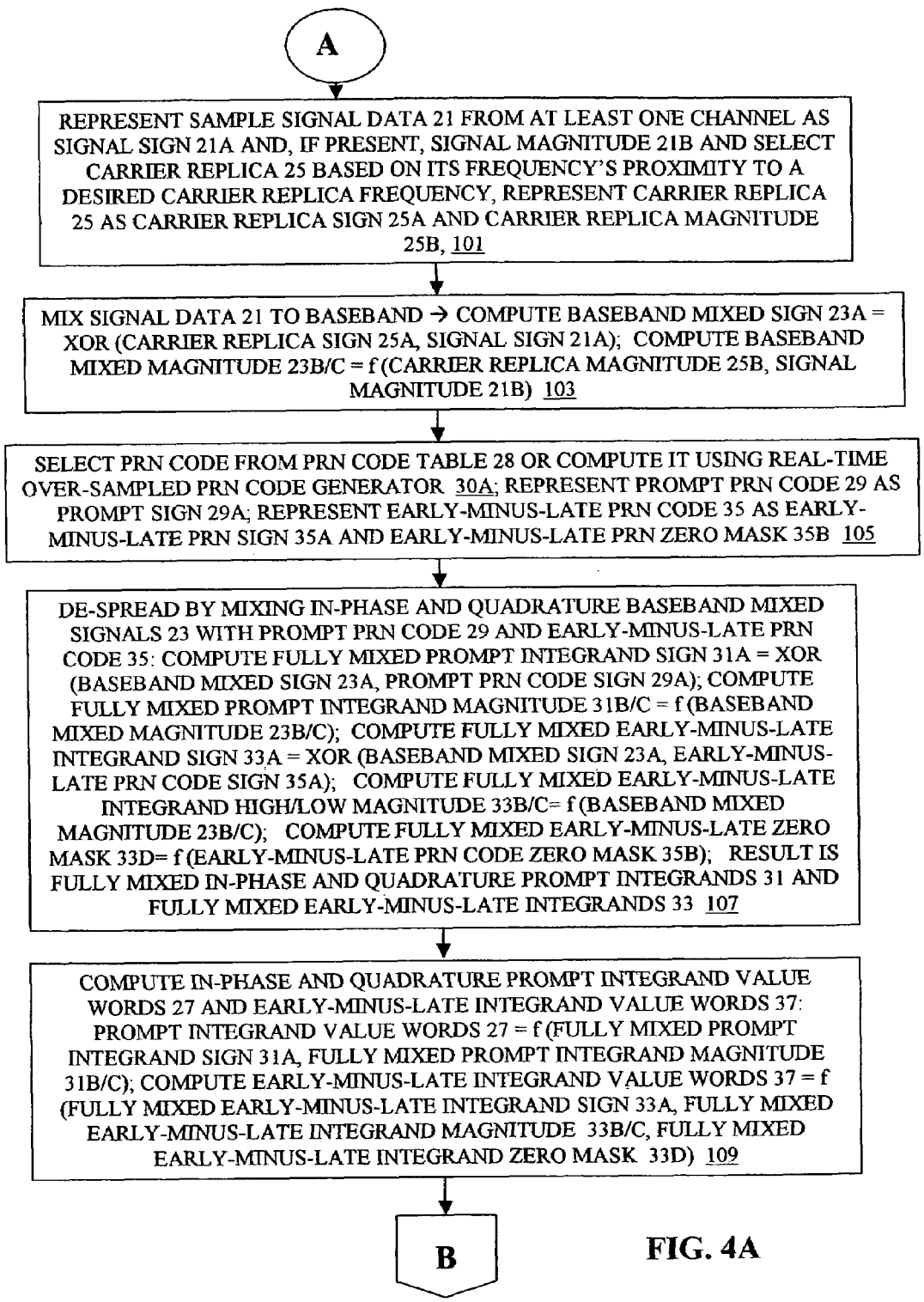
FIGS. 4A and 4B are flowcharts of the method for computing correlation accumulations through bit-wise parallel computations of the present invention.

Referring now to FIGS. 3A, 3B, 4A, and 4B, the method for computing in-phase and quadrature accumulations for every accumulation period, for example every millisecond for GPS C/A code, by use of bit-wise parallelism includes the steps of selecting carrier replica signal 25 (FIG. 3A) according to the proximity of its frequency to the desired frequency, and representing sample signal data 21 (FIG. 3A) and carrier replica signal 25 (FIG. 3A) from at least one channel as bits in signal sign 21A (FIG. 3A) and, if present, signal magnitude 21B (FIG. 3A) and carrier replica sign 25A (FIG. 3A) and carrier replica magnitude 25B (FIG. 3A) (method step 101, FIG. 4A). Note that carrier replica signal 25 (FIG. 3A) is chosen so that its frequency is close to the correct signal frequency. The method also includes the step of mixing signal data 21 (FIG. 3A) to baseband by computing in-phase and quadrature baseband mixed sign 23A (FIG. 3A) and in-phase and quadrature baseband mixed high and low magnitude 23B/C (FIG. 3A) (method step 103, FIG. 4A). The method further includes the steps of selecting PRN code from pre-computed over-sampled PRN code table 28 (FIG. 3A) or of computing it using real-time over-sampled PRN code generator 30A (FIG. 3A), representing prompt PRN code 29 (FIG. 3A) as prompt PRN code sign 29A (FIG. 3A), and representing early-minus-late PRN code 35 (FIG. 3A) from as early-minus-late PRN code sign 35A (FIG. 3A) and early-minus-late PRN code zero mask 35B (FIG. 3A) (method step 105, FIG. 4A). The method further includes the step of de-spreading in-phase and quadrature baseband mixed signal 23 (FIG. 3A) by mixing it with prompt PRN code 29 (FIG. 3A) and early-minus-late PRN code 35 (FIG. 3A), resulting in in-phase and quadrature fully mixed prompt integrands 31 (FIG. 3A), and fully mixed early-minus-late integrands 33 (FIG. 3A) (method step 107, FIG. 4A). The method further includes the step of using prompt value word logic 27A (FIG. 3B) to compute prompt integrand value words 27 (FIG. 3B) from the in-phase and quadrature fully mixed prompt integrands 31 (FIG. 3A). The method further includes the step of using early-minus-late value word logic 37A (FIG. 3B) to compute early-minus-late integrand value words 37 (FIG. 3B) from the fully mixed early-minus-late integrands 33 (FIG. 3B) (method step 109, FIG. 4A). The method further includes the steps of summing over each prompt integrand value word 27 and early-minus-late integrand value word 37 (FIG. 3B) the number of one bits (or zero bits) using one bits summation table 38 (FIG. 3B) or using a processor command if available (method step 111, FIG. 4B), and summing, over the accumulation interval, the number of one bits (or zero bits) in each prompt integrand value word 27 and early-minus-late integrand value word 37 to produce prompt accumulations 41 (FIG. 3B) and early-minus-late accumulations 49 (FIG. 3B) (method step 113, FIG. 4B). The method further includes the step of multiplying prompt accumulations 41 (FIG. 3B) and early-minus-late accumulations 49 (FIG. 3B) by corresponding values 41A and summing the results over the value words of each signal for an entire accumulation interval to yield in-phase and quadrature summed prompt accumulations 45 (FIG. 3B) and summed early-minus-late accumulations 47 (FIG. 3B) (method step 115, FIG. 4B) that are stored for use by acquisition techniques or tracking loops. The method further includes the step of rotating the in-phase and quadrature summed prompt accumulations 45 (FIG. 3B) and summed early-minus-late accumulations 47 (FIG. 3B) (method step 117, FIG. 4B) to simulate a condition in which baseband mixing had been performed using cosine and sine signal replicas with the correct frequency and phase. If there are more channels to process (decision step 119, FIG. 4B), the method includes the step of repeating the previous steps beginning at method step 101, FIG. 4A. If there are no more channels to process (decision step 119, FIG. 4B), the method includes the step of setting parameters for the next accumulation period, including storing current C/A code phases, epoch counters, carrier phases, and carrier Doppler shifts (method step 121, FIG. 4B). If the time period to wait until the next accumulations need to be calculated has not expired (decision step 123, FIG. 4B), the method includes the step of sleeping until the expiration of the time period (method step 125, FIG. 4B). If the time period has expired (decision step 123, FIG. 4B), the method includes the step of repeating the previous steps beginning at method step 101, FIG. 4A. The length of the time period depends on the nominal accumulation period. It is set to be less than this period, normally between 50% to 90% of this period, to reduce the possibility that accumulations are missed for any channels.

Referring again to FIGS. 3B and 4A, method step 109 (FIG. 4A) calls for computing value words. This computation starts by performing bit-wise parallel Boolean logic for each of the possible values in the right-hand column of the prompt integrand representation in Table 6. A 32-bit prompt integrand value word 27 (FIG. 3B) is computed for each thirty-two samples and each row of Table 6. The prompt integrand value word 27 (FIG. 3B) contains ones for the sample times when the actual integrand equals the corresponding value in the right-hand column of Table 6, and zeros for the remaining times when the actual integrand does not equal this value. The prompt integrand value words 27 (FIG. 3B) corresponding to the possible Table 6 values are formed by method step 109 (FIG. 4A) as follows:

$$\text{MINUSONE} = \text{NOT(SIGN) AND [NOT(HIGHMAG) AND NOT(LOWMAG)]} \tag{13}$$

$$\text{MINUSTWO} = \text{NOT(SIGN) AND [NOT(HIGHMAG) AND LOWMAG]} \tag{14}$$

$$\text{MINUSTHREE} = \text{NOT(SIGN) AND [HIGHMAG AND NOT(LOWMAG)]} \tag{15}$$

$$\text{MINUSSIX} = \text{NOT(SIGN) AND [HIGHMAG AND LOWMAG]} \tag{16}$$

$$\text{PLUSONE} = \text{SIGN AND [NOT(HIGHMAG) AND NOT(LOWMAG)]} \tag{17}$$

$$\text{PLUSTWO} = \text{SIGN AND [NOT(HIGHMAG) AND LOWMAG]} \tag{18}$$

$$\text{PLUSTHREE} = \text{SIGN AND [HIGHMAG AND NOT(LOWMAG)]} \tag{19}$$

$$\text{PLUSSIX} = \text{SIGN AND [HIGHMAG AND LOWMAG]} \tag{20}$$

Continuing to refer to FIGS. 3A, 3B, 4A, and 4B, method steps 109 (FIG. 4A), 111 (FIG. 4B), and 113 (FIG. 4B) call for operations for the fully mixed early-minus-late integrands 33 (FIG. 3A) that are similar to those for the fully mixed prompt integrands 31 (FIG. 3A). Early-minus-late integrand value words 37 (FIG. 3B) correspond to values that are double those of the prompt integrand value words 27 (FIG. 3B), i.e., the MINUSSIX word becomes the MINUSTWELVE word. Also, an additional AND operation must be performed with the zero mask bits of Table 7 in order to mask out sample times when the early and late PRN codes cancel each other. Possible formulas for the method step 109 (FIG. 4A) computation of these early-minus-late integrand value words 37 (FIG. 3B) are as follows:

$$\text{MINUSTWO} = [\text{ZEROMASK AND NOT(SIGN)}] \text{ AND [NOT(HIGHMAG) AND NOT(LOWMAG)]} \tag{21}$$

$$\text{MINUSFOUR} = [\text{ZEROMASK AND NOT(SIGN)}] \text{ AND [NOT(HIGHMAG) AND LOWMAG]} \tag{22}$$

$$\text{MINUSSIX} = [\text{ZEROMASK AND NOT(SIGN)}] \text{ AND [HIGHMAG AND NOT(LOWMAG)]} \tag{23}$$

$$\text{MINUSTWELVE} = [\text{ZEROMASK AND NOT(SIGN)}] \text{ AND [HIGHMAG AND LOWMAG]} \tag{24}$$

$$\text{PLUSTWO} = [\text{ZEROMASK AND SIGN}] \text{ AND [NOT(HIGHMAG) AND NOT(LOWMAG)]} \tag{25}$$

$$\text{PLUSFOUR} = [\text{ZEROMASK AND SIGN}] \text{ AND [NOT(HIGHMAG) AND LOWMAG]} \tag{26}$$

PLUSSIX=[ZEROMASK AND SIGN] AND
[HIGHMAG AND NOT(LOWMAG)]  (27)

PLUSTWELVE=[ZEROMASK AND SIGN] AND
[HIGHMAG AND LOWMAG]  (28)

Additional zero masking can occur in the first and last words of an accumulation interval. This is true because the start and stop times of an accumulation interval do not normally fall at the boundaries of data words. Therefore, the bits in the first word that precede the accumulation interval may need to get zero masked as might the bits in the last word that come after the end of the accumulation interval.

Figure 4B:
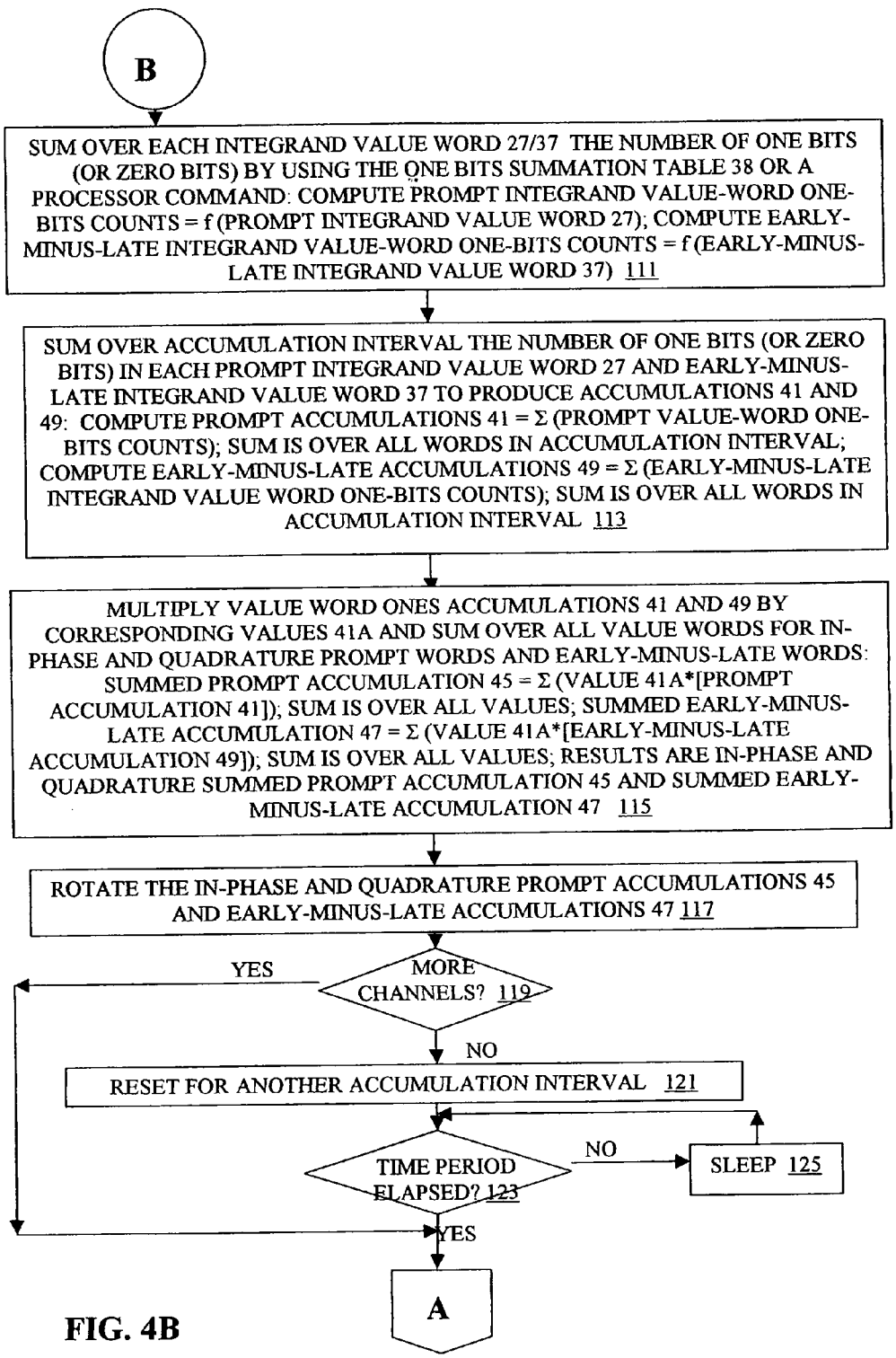

Referring primarily to FIGS. 3B and 4B, the one bits counting operations of method step 111 (FIG. 4B) form the count of the number of one bits in each of the eight value words. If there are no such counting operations in the instruction set of microprocessor 16 (FIG. 1), the counting can be accomplished using a table look-up. In the case of a table look-up, prompt integrand value words 27 and early-minus-late integrand value words 37 (FIG. 3B) can be used as addresses in one bits summation table 38 (FIG. 3B), and one bits summation table 38 (FIG. 3B) can output the number of one values (or zeros) in the address. For example, if the table look-up operation is called BITSUM, the following computations can be performed to compute one-bits counts:

ONESCOUNT=BITSUM(VALUEWORD)  (29)

where the output of the table ONESCOUNT is the number of one bits in the word VALUEWORD. This operation is repeated for each of the prompt integrand value words 27 (FIG. 3B) and early-minus-late integrand value words 37 (FIG. 3B) in order to accomplish method step 111 (FIG. 4B). Selection of table width, for example 16-bit or 32-bit, depends on the amount of memory available and other design decisions. If the table width is smaller than the number of bits in a value word, then multiple calls of the table are used in order to sum up the total number of one values in a given value word. Each call takes as input only a portion of the bits in the value word.

Continuing to refer primarily to FIGS. 3B and 4B, the accumulation operations of method steps 113 (FIG. 4B) and 115 (FIG. 4B) sum the one bit counts for each prompt integrand value word 27 (FIG. 3B) and for each early-minus-late integrand value word 37 (FIG. 3B) over the entire accumulation interval, multiply each result by the value 41A (FIG. 3B) that is associated with the value word, and sum all of these scaled value accumulations to form the accumulations of equations (6) and (7), summed prompt accumulation 45 (FIG. 3B) and summed early-minus-late accumulation 47 (FIG. 3B). For example, the following computations can be performed to compute the in-phase summed prompt accumulation 45 in equation (6) as follows:

$$I_{gjk}(0) = -\sum_{l=1}^{N_w} ONESCOUNT(-1)_{lpl} - 2\sum_{l=1}^{N_w} ONESCOUNT(-2)_{lpl} -$$
$$3\sum_{l=1}^{N_w} ONESCOUNT(-3)_{lpl} - 6\sum_{l=1}^{N_w} ONESCOUNT(-6)_{lpl} +$$
$$\sum_{l=1}^{N_w} ONESCOUNT(+1)_{lpl} + 2\sum_{l=1}^{N_w} ONESCOUNT(+2)_{lpl} +$$  (30)

-continued
$$3\sum_{l=1}^{N_w} ONESCOUNT(+3)_{lpl} + 6\sum_{l=1}^{N_w} ONESCOUNT(+6)_{lpl}$$

where l is the index of successive bit-wise parallel data words in the accumulation interval, $N_w$ is the total number of data words in the interval, and ONESCOUNT(k)$_{lpl}$ is the ones count for the corresponding value word 41 (FIG. 3B) associated with value k 41A (FIG. 3B) for the lth data word interval and the in-phase summed prompt accumulation 45 (FIG. 3B). The quadrature summed prompt accumulations 45 (FIG. 3B) and the in-phase and quadrature summed early-minus-late accumulations 47 (FIG. 3B) are calculated in a similar manner. The only difference is in the actual ONESCOUNT values used and, for the case of early-minus-late signals, the set of k values 41A (FIG. 3B).

Continuing to refer primarily to FIGS. 4A and 4B, the method of the present invention can be adapted to work with a different number of bits in the representation of the RF front-end output and of the baseband mixed signals. An increase above two bits can make the logic more complex and may decrease the time savings over straight integer arithmetic. A decrease to a 1-bit representation can have the opposite effect. For example, if the RF front-end uses 1-bit digitization rather than 2-bit digitization while carrier replica signal 25 (FIG. 2B) retains its 2-bit digitization, then the operation count can decrease by a factor of almost two for the 1-bit method, which can make the logic execute about 4.2 times faster than straight integer arithmetic.

Returning to the discussion of determining PRN code, and now referring again FIGS. 2C, 2D, and 3A, the real-time generation of bit-wise parallel over-sampled prompt PRN code sign 29A (FIGS. 2D and 3A), early-minus-late PRN code sign 35A (FIGS. 2D and 3A), and early-minus-late PRN code zero mask 35B (FIGS. 2D and 3A) can be carried out by real-time over-sampled PRN code generator 30A (FIG. 3A). The inputs to this calculation are the actual PRN code chip length 65 (FIG. 2D), $\Delta t_c$, the sample interval 63 (FIG. 2D), $\Delta t_s$, the nominal early-to-late code delay 61 (FIG. 2D), $\Delta t_{eml}$, the end time of the first code chip relative to the first sample time, or put another way, the time lag $\Delta t_0$, 67 (FIG. 2D) from the first RF sample time to the end time of the first prompt PRN code chip, and prompt code chips 91 (FIGS. 2D and 6). The outputs are the three integers that store the prompt PRN code sign 29A (FIGS. 2D and 3A), early-minus-late PRN code zero mask 35B (FIGS. 2D and 3A), and early-minus-late PRN code sign 35A (FIGS. 2D and 3A), which are all in bit-wise parallel format.

Referring again to FIGS. 2C and 2D, table look-ups can be used to translate a PRN code and its timing information to bit-wise parallel representations of its over-sampled prompt and early-minus-late versions. The required table look-ups can be simplified by recognizing that the following parameters are substantially constant, for the purposes of this calculation: sampling interval 63 (FIG. 2D), $\Delta t_s$, the nominal chip length, $\Delta t_{cnom}$, the early-minus-late code delay 61 (FIG. 2D), $\Delta t_{eml}$, used by software correlator 19 (FIG. 1), and the maximum number of chips that span a data word of microprocessor 16 (FIG. 1). The difference between the actual chipping rate $\Delta f_c$, (reciprocal of $\Delta t_c$) and the nominal chipping rate $\Delta f_{cnom}$ (reciprocal of $\Delta t_{cnom}$) that is used for the above simplification can be accommodated by correcting time lag 67 (FIG. 2D), $\Delta t_0$, for the average effects of Doppler shift, a procedure discussed later. Using the simplification, each look-up table has two variable inputs: the actual set of prompt code chips 91 (FIGS. 2D and 6) and time lag 67 (FIG. 2D), $\Delta t_0$. A table look-up procedure for each signal component yields a single integer result for prompt PRN code sign 29A (FIGS. 2D and 3A), another single integer result for early-minus-late PRN code zero mask 35B (FIGS. 2D and 3A), and yet another single integer result for early-minus-late PRN code sign 35A (FIGS. 2D and 3A).

Time lag 67 (FIG. 2D), $\Delta t_0$, can take on an infinite number of values in the continuous range:

$$-\frac{1}{2}\Delta t_{eml} < \Delta t_0 \leq \Delta t_c - \frac{1}{2}\Delta t_{eml} \qquad (31)$$

This range's lower limit guarantees that the end time of the first late chip occurs no earlier than the first sample time. A lower time lag 67 (FIG. 2D) $\Delta t_0$ value would make the first chip irrelevant to the prompt PRN code 29 (FIG. 2D), early code 69B (FIG. 2D), and late code 69C (FIG. 2D) at all of the sample times. The upper limit in equation (31) guarantees that the start time of the first late chip occurs no later than the first sample. A larger value of $\Delta t_0$ would leave the late code 69C (FIG. 2D) at the first sample time undefined based on the available code chips.

Referring now to FIG. 5, to create an electronically processable table, the continuous range of $\Delta t_0$ values can be replaced with a discrete grid having m equally spaced points per sample interval 63 (FIG. 2D), $\Delta t_s$. The integer m is chosen to be large enough so that the granularity $\Delta t_s/m$ gives sufficient PRN code timing resolution. In GPS applications m is usually chosen to be large enough so that $(c\Delta t_s/m)$ is on the order of several meters or less, where c is the speed of light, but reasonably sized because the table sizes are usually proportional to m. Given a choice of m, the grid of relative end times of the first prompt code period is:

$$\Delta t_{0k} = \frac{k\Delta t_s}{m} \text{ for } k = k_{\min}, \ldots, k_{\max} \qquad (32)$$

where the limits $$k_{\min} = \text{floor}\left(-\frac{m\Delta t_{eml}}{2\Delta t_s}\right) - 2 \qquad (33a)$$

$$k_{\max} = \text{floor}\left(\frac{m\left[\Delta t_c - \frac{1}{2}\Delta t_{eml}\right]}{\Delta t_s}\right) \qquad (33b)$$

provide full coverage of the interval defined in equation (31). The floor ( ) function rounds to the nearest integer in the direction of $-\infty$. This $k_{\min}$ value can cause the minimum $\Delta t_{0k}$ to fall slightly below the lower limit in equation (31), which can cause memory inefficiency, but this value is advantageous because it may simplify some further computations.

The size for each table can be a function of the maximum number of code chips that may fall within a data word's sample range. Given $\Delta t_0$, bit information for the following number of code chips is required in order for the prompt PRN code 29 (FIG. 2D), early code 69B (FIG. 2D), and late code 69C (FIG. 2D) to be fully specified at all of the data word's sample times:

$$l(\Delta t_0) = \text{floor}\left\{\frac{[n_s - 1]\Delta t_s - \Delta t_0 + \frac{1}{2}\Delta t_{eml}}{\Delta t_c}\right\} + 2 \qquad (34)$$

where $n_s$ is the number of data samples that can be stored in bit-wise parallel format in each word. It is clear from equation (34) that $l(\Delta t_0)$ is a non-increasing function of $\Delta t_0$. Therefore, the maximum number of required chips occurs at the minimum value of $\Delta t_0$:

$$L = l(\Delta t_{0k\ min}) \qquad (35)$$

The size of each table can be determined from the parameters $k_{min}$, $k_{max}$, and L. The grid contains $k_{tot}=(k_{max}-k_{min}+1)$ different time offsets of the first code chip. At each of these grid points there are $2^L$ possible combinations of the code chips. Thus, each table optimally contains $k_{tot} \times 2^L$ entries, and each entry is optimally an unsigned integer in the range from 0 to $2^{n_s}-1$.

Continuing to refer to FIG. 5, each table can be stored as an array with a single index. The first $2^L$ entries correspond to the $2^L$ different possible chip sequences that can occur at $\Delta t_0 = \Delta t_{0k\ min}$, the next $2^L$ entries correspond to $\Delta t_0 = \Delta t_{0(kmin+1)}$, and so forth. The tabulated bit sequences for a fixed $\Delta t_0$ are ordered by interpreting the sequence as a binary index counter with the first chip being the most significant counter bit and the $L^{th}$ chip being the least significant bit. The integer elements of the table can be the x(i) table elements 81 with corresponding code time offset 83 $\Delta t_{0k}$, and corresponding bit sequence 85 of the chips. The array index of a given x(i) table element 81 can be computed based on its code time offset 83 $\Delta t_{0k}$ grid index k and its corresponding bit sequence 85. The corresponding bit sequence 85 associated with the array index consists of the chip values C(1), C(2), C(3), ... C(L). The C(j) chip values are either zero or one, with zero representing a $-1$ PRN code value and one representing a $+1$ PRN code value, and they are listed in order of increasing time. The corresponding array index of the x(i) table element 81 is:

$$i[k, C(1), C(2), C(3), \ldots, C(L)] = 1 + (k - k_{\min}) \times 2^L + \sum_{j=1}^{L} C(j) 2^{L-j} \qquad (36)$$

This equation can be inverted to give the code time offset 83 grid index k and the corresponding bit sequence 85 as functions of the x(i) table element 81 index i:

$$k(i) = k_{min} + \text{floor}[(i-1)/2^L] \qquad (37a)$$

$$C(j, i) = \text{mod}\left(\text{floor}\left\{\frac{\text{mod}[(i-1), 2^L]}{2^{L-j}}\right\}, 2\right) \text{ for } j = 1, 2, 3, \ldots, L \qquad (37b)$$

where $\text{mod}(y,z)=y-z \times \text{floor}(y/z)$ is the usual remainder function.

Continuing to refer to FIG. 5, the following computations generate the x(i) table elements 81 entries of the three tables. Given i, the corresponding code time offset 83 grid index k(i) is computed from equation (37a) and is used to generate three sequences of chip indices:

$$j_p(n, i) = 2 + \text{floor}\left\{\left[n - 1 - \frac{k(i)}{m}\right]\left[\frac{\Delta t_s}{\Delta t_c}\right]\right\} \quad (38a)$$

for $n = 1, 2, 3, \ldots, n_s$ $$j_e(n, i) = 2 + \text{floor}\left\{\left[n - 1 - \frac{k(i)}{m}\right]\left[\frac{\Delta t_s}{\Delta t_c}\right] + \left[\frac{\Delta t_{eml}}{2\Delta t_c}\right]\right\} \quad (38b)$$

for $n = 1, 2, 3, \ldots, n_s$ $$j_l(n, i) = 2 + \text{floor}\left\{\left[n - 1 - \frac{k(i)}{m}\right]\left[\frac{\Delta t_s}{\Delta t_c}\right] - \left[\frac{\Delta t_{eml}}{2\Delta t_c}\right]\right\} \quad (38c)$$

for $n = 1, 2, 3, \ldots, n_s$ where n is the index of the sample time within the oversampled data word. The integer $j_p(n,i)$ is the index of the PRN code chip that applies at sample n for the prompt PRN code 29 (FIG. 2D). The integers $j_e(n,i)$ and $j_l(n,i)$ are defined similarly for the early code 69B (FIG. 2D) and late code 69C (FIG. 2D), respectively. The formulas in equations (38a)-(38c) amount to time measurements of each sample given in units of chip lengths past the first chip. These indices, in turn, can be used to determine the chip values that apply at the sample times:

$$C_p(n,i) = C[j_p(n,i); i] \text{ for } n=1,2,3,\ldots,n_s \quad (39a)$$

$$C_e(n,i) = C[j_e(n,i); i] \text{ for } n=1,2,3,\ldots,n_s \quad (39b)$$

$$C_l(n,i) = C[j_l(n,i); i] \text{ for } n=1,2,3,\ldots,n_s \quad (39c)$$

where $C_p(n,i)$ is the over-sampled prompt PRN code 29 (FIG. 2D), and $C_e(n,i)$ and $C_l(n,i)$ are, respectively, the early code 69B (FIG. 2D) and late code 69C (FIG. 2D). Each of these code bit values is either zero or one, as dictated by the outer mod(,2) operation in equation (37b). These over-sampled chip values can, in turn, be used to formulate tabulated functions $x_p(i)$, $x_{emlzm}(i)$, and $x_{eml2s}(i)$ that generate the unsigned integers that constitute the bit-wise parallel code representations of the three tables:

$$x_p(i) = \sum_{n=1}^{n_s} C_p(n, i) \times 2^{n_s - n} \quad (40a)$$

$$x_{emlzm}(i) = \sum_{n=1}^{n_s} \text{mod}\{[C_e(n, i) + C_l(n, i)], 2\} \times 2^{n_s - n} \quad (40b)$$

$$x_{eml2s}(i) = \sum_{n=1}^{n_s} \text{mod}\{[C_e(n, i) + C_l(n, i)], 2\} \times C_e(n, i) \times 2^{n_s - n} \quad (40c)$$

where $x_p(i)$ is the entry of the prompt sign table, $x_{emlzm}(i)$ is the entry of the early-minus-late zero mask table, and $x_{eml2s}(i)$ is the entry of the early-minus-late 2's sign table. Note that the formula used in equation (40c) is only an example illustrative embodiment of the early-minus-late 2's sign table calculation. It places zeros in all of the X entries of early-minus-late PRN code sign 35A (FIG. 2D). There exist alternate formulas that are equally correct but that do not place zeros in the X entries.

The table layout in FIG. 5 is only an illustrative embodiment of how one can construct a table that can be used to translate PRN code chip values and timing information into data words that store the bit-wise parallel representations of the over-sampled prompt PRN code sign 29A (FIG. 2D), early-minus-late PRN code zero mask 35B (FIG. 2D), and early-minus-late PRN code sign 35A (FIG. 2D). Other table layouts are also possible. Possible illustrative index calculations are described below for indexing into the tables for PRN code retrieval during accumulation calculations If another table layout is used, then different indexing calculations might be needed. Furthermore, different indexing calculations can be used even for the illustrative table layout shown in FIG. 5.

Referring now primarily to FIG. 6, accumulation calculations, as have been previously outlined herein and elsewhere, work with a fixed sequence of code chips. The prompt version of this sequence has a specified timing relationship to the incoming RF signal data 21 (FIG. 2A). This relationship can be pre-determined by a code search algorithm if software receiver 10 (FIG. 1) is in acquisition mode or by its delay-locked loop if it is in tracking mode. Software correlator 19 (FIG. 1) can calculate an accumulation using prompt code chips 91 (FIG. 6) C(1) through C(M). The timing of the prompt replicas of prompt code chips 91 (FIG. 6) can define the accumulation interval. The chip sequence starts at start lag 93 (FIG. 6) $\Delta t_{start}$ seconds past the first sample of data word $W_1$ 95 (FIG. 6), it chips at the constant chipping rate $f_c = 1/\Delta t_c$, and it ends at end time 97 (FIG. 6), which occurs $\Delta t^{start} + M\Delta t_c$ seconds after the first sample of data word $W_1$ 95 (FIG. 6). The end of the $M^{th}$ prompt code chip can occur during data word $W_N$ 99 (FIG. 6), which implies that $$N = \text{ceil}\left(\frac{\Delta t_{start} + M\Delta t_c}{n_s \Delta t_s}\right) \quad (41)$$

where the ceil( ) function rounds to the nearest integer towards $+\infty$. Some of the initial bits of data word $W_1$ 95 (FIG. 6) and some of the final bits of data word $W_N$ 99 (FIG. 6) may not be included in the accumulation. Let $n_{ex0}$ be the number of initial bits of data word $W_1$ 95 (FIG. 6) that are excluded, and let $n_{exf}$ be the number of final bits of data word $W_N$ 99 (FIG. 6) that are excluded. The timing relationship in FIG. 6 implies that these numbers are:

$$n_{ex0} = \text{ceil}\left(\frac{\Delta t_{start}}{\Delta t_s}\right) \quad (42a)$$

$$n_{exf} = n_s N - \text{ceil}\left(\frac{\Delta t_{start} + M\Delta t_c}{\Delta t_s}\right) \quad (42b)$$

These sample counts can be used to develop additional zero mask words that software correlator 19 (FIG. 1) uses to properly process the first and last data words during its bit-wise parallel accumulation calculations, as defined in *A 12-Channel Real-Time GPS L1 Software Receiver*, B. M. Ledvina et al., *Proceedings of the ION National Technical Meeting*, Jan. 22-24, 2003, Anaheim, Calif. and *Bit-Wise Parallel Algorithms for Efficient Software Correlation Applied to a GPS Software Receiver*, B. M. Ledvina et al., to appear in the *IEEE Transactions on Wireless Communications*, 2003, both incorporated herein in their entirety by reference. Note that equations (41)-(42b) and all related timing considerations herein use the following code chip start/stop convention: a sample is correlated with a particular code chip if the start time of the code chip coincides exactly with the sample time, but it will not get correlated with that chip if its sample time coincides exactly with the end time of the code chip.

Continuing to refer to FIG. 6, efficiently determining the correct $x_p(i)$, $X_{emlzm}(i)$, and $x_{eml2s}(i)$ bit-wise parallel code representations for the N data words $W_1$ 95 (FIG. 6) through data word $W_N$ 99 (FIG. 6) involves making an efficient determination of the correct table index $i_v$ that corresponds to data word $W_{v \text{ for } v}=1, \ldots, N$, where the table index $i_v$ is a function of start lag $\Delta t_{start}$ 93 (FIG. 6), actual PRN code chip length $\Delta t_c$ 65 (FIG. 6), v, and prompt code chips C(0), C(1), C(2), . . . , C(M+1) 91 (FIG. 6). The chip value C(0) 94 (FIG. 6) is needed in order to specify the late code 69C (FIG. 2D) at the initial few samples of the accumulation, and the chip value C(M+1) 96 (FIG. 6) is needed to specify the early code 69B (FIG. 2D) at the final few samples. Additional constants that can be used in order to determine the $i_v$ indices are $\Delta t_s$, $n_s$, m, L, $k_{min}$, $k_{max}$, and nominal chip length $\Delta t_{cnom}$, which has been used to generate the three x(i) tables.

The first step of the index calculation procedure precomputes and stores a table of candidate integers for the final summation term that appears on the right-hand side of equation (36). This table takes the form:

$$\Delta i(\mu) = \sum_{j=1}^{L} C(\mu + j - L - 1) 2^{L-j} \quad (43)$$

$$\text{for } \mu = 1, 2, 3, \ldots, (M + L + 1)$$

This computation requires the undefined chip values C(−L+1), C(−L+2), C(−L+3), . . . , C(−1), and C(M+2), C(M+3), C(M+4), . . . , C(M+L). The value zero can be used for each of these undefined chips because they can affect the oversampled codes only for the first $n_{ex0}$ samples of data word $W_1$ 95 (FIG. 6) or for the last $n_{exf}$ samples of data word $W_N$ 99 (FIG. 6), none of which are part of the accumulation. The table of equation (43) can be constructed by using the following iterative procedure:

$$\Delta i(1) = C(0) \quad (44a)$$

$$\Delta i(\mu) = \text{mod}[2\Delta i(\mu-1), 2^L] + C(\mu-1) \text{ for } \mu=2,3,4,\ldots,(M+2) \quad (44b)$$

$$\Delta i(\mu) = \text{mod}[2\Delta i(\mu-1), 2^L] \text{ for } \mu=(M+3), (M+4), \ldots, (M+L+1) \quad (44c)$$

Note that the mod($2\times,2^L$) operation in the latter two equations can be replaced by a single truncated leftward bit shift.

In many cases prompt code chips 91 (FIG. 6) C(0), C(1), C(2), . . . can be generated as the output of a feedback shift register or a system of such registers. For example, the new GPS civilian L2 signals can be generated this way. In this case, each iteration of equation (44b) can be interleaved with an iteration of the shift register calculations. Shift-register generation of PRN codes is well-known in the art.

An alternative to building up the previously-described table is to calculate the index component only for one data word at a time. Suppose that $\Delta i_v$ is the correct index component for data word $W_v$, and that $\mu_v$ is the auxiliary index that would have been used to determine $\Delta i_v$ from the $\Delta i(\mu)$ table had the table existed. In order to calculate $\Delta i_{v+1}$ for data word $W_{v+1}$, $\mu_{v+1}$ is computed (procedure defined herein), feedback shift register calculations that generate $C(\mu_v), C(\mu_v+1), C(\mu_v+2), \ldots, C(\mu_{v+1}-1)$ are iterated, and the resulting chip values are used to perform ($\mu_{v+1}-\mu_v$) iterations of equations (44b) or (44c).

Determination of the correct index into the $x_p(i)$, $x_{emlzm}(i)$, and $x_{eml2s}(i)$ tables for data word $W_v$ can be reduced to the determination of two quantities. One is the time offset index $k_v$ that causes $\Delta t_{0kv}$ from equation (32) to match the true time offset for data word $W_v$ as closely as possible. The other quantity is the auxiliary table index $\mu_v$. It constitutes an index for the sequence of actual code chips that are associated with data word $W_v$. Given these two quantities, the correct index for the three x(i) tables is $$i_v = 1 + (k_v - k_{min}) \times 2^L + \Delta i(\mu_v) \text{ for } v=1,2,3 \ldots, N \quad (45)$$

The auxiliary index $\mu_v$ is determined by the position of the $W_v$ data word relative to the PRN code chip sequence. Once that position has been ascertained, the index $k_v$ can be calculated from the position relative to the $W_v$ samples of the L code chips that are associated with the index $\mu_v$.

A time integer can keep track of the number of fine-scale time units in a given interval. The fine-scale time unit is a small fraction of the sample interval 63 (FIG. 2D), $\Delta t_s$:

$$\Delta t_f = \frac{\Delta t_s}{m_f} \quad (46)$$

where $m_f$ is the integer number of fine-scale time intervals per sample interval 63 (FIG. 2D), $\Delta t_s$. This number is chosen large enough, for example $m_f > 2mN$, to preclude any significant build-up of timing errors during an accumulation interval due to the finite time resolution $\Delta t_f$. N is the number of data words in the accumulation interval. The calculation of the $k_v$ values over one accumulation interval involves approximately N iterative time increments, each of which has a resolution of $\Delta t_f$. If $m_f$ obeys the inequality given above, then the cumulative timing errors due to the finite precision $\Delta t_f$ will be less than the timing error caused by the finite timing precision of the x(i) tables. Normally it is possible to make $m_f$ much larger than 2mN and still keep all of the relevant calculations within the size limits of a 32-bit signed integer. If $m_f$ is a power of two, a rightward bit shift operation can be used to implement integer division by $m_f$. Time unit $\Delta t_f$ can be used to define an integer that approximately keeps track of the code/sample time offset $\Delta t_{0v}$ for data word $W_v$:

$$k_{fv} \cong \text{round}\left(\frac{\Delta t_{0v}}{\Delta t_f}\right) = \text{round}\left(\frac{m_f \Delta t_{0v}}{\Delta t_s}\right) \quad (47)$$

where the round( ) function rounds up or down to the nearest integer. The time lag 67 (FIG. 2D), $\Delta t_{0v}$, is the amount by which the end time of PRN code chip $C(\mu_v-L)$ lags the first sample time of data word $W_v$. The algorithm that iteratively determines $k_{fv}$ tries to keep the relationship in equation (47) exact, but using only integer operations can allow small errors to build up. Note that $k_{fv} \text{lm}_f \cong k_v \text{lm}$, as implied by a comparison of equations (32) and (47). This relationship can be used to determine $k_v$ from an iteratively determined $k_{fv}$. Several constants are required by the iterative procedure that determines $k_{fv}$, $k_v$ and $\mu_v$. The first five constants are used to account for the difference between the nominal chip length $\Delta t_{cnom}$, used to generate the x(i) tables, and the actual chip length 65 (FIG. 2D), $\Delta t_c$ used in the accumulation:

$$k_{fmid} = \text{round}[(n_s-1)m_f/2] \quad (48a)$$

$$\lambda = \frac{\Delta t_c - \Delta t_{cnom}}{\Delta t_c} \quad (48b)$$

$$a_{fix0} = \text{ceil}\left[\left(k_{fmid} - \frac{m_f k_{min}}{m}\right)\lambda^2\right] \text{sign}(\lambda) \quad (48c)$$

$$b_{fix} = \begin{cases} 1 & \text{if } \Delta t_c = \Delta t_{cnom} \\ 2^{\text{ceil}[\log(a_{fix0}/\lambda)/\log(2)]} & \text{if } \Delta t_c \neq \Delta t_{cnom} \end{cases} \quad (48d)$$

$$a_{fix} = \text{round}(\lambda b_{fix}) \quad (48e)$$

where the sign( ) function returns +1 if its input argument is positive, zero if the argument is zero, and −1 if the argument is negative. The index $k_{fmid}$ is approximately half the length of a data word as measured in units of $\Delta t_f$ seconds. During an accumulation, the rational factor $a_{fix}/b_{fix}$ gets multiplied by the time offset between the end time of the first code chip and the midpoint of the data word. The result is a time perturbation that removes the average effect of the difference between the actual and nominal PRN code chipping rates. The time perturbation can be used to compute a corrected $k_{fv}$ value:

$$k_{fvfix}(k_{fv}) = k_{fv} + \text{round}\left[(k_{fmid} - k_{fv})\frac{a_{fix}}{b_{fix}}\right] \quad (49)$$

Equation (48d) picks $b_{fix}$ to equal a power of two so that the integer division by $b_{fix}$ in equation (49) can be accomplished using a rightward bit shift operation. The round( ) operation in equation (49) can be accomplished as part of the division if one first adds $\text{sign}(a_{fix}) \times b_{fix}/2$ to the quantity $(k_{fmid} - k_{fv}) \times a_{fix}$ before performing the rightward bit shift that constitutes division by $b_{fix}$. This approach can give the correct $k_{fvfix}$ because the signs of $(k_{fmid} - k_{fv})$ and $b_{fix}$ are both positive and because the rightward bit shift has the effect of rounding the signed division result towards zero. An alternate implementation of the round function could be used for applications that do not guarantee $k_{fmid} > k_{fv}$. Such applications are normally associated with $L \leq 2$ PRN code chips per data word.

Five additional constants can be used to define the $k_{fv}$ and $\mu_v$ iterations:

$$L_{typ} = \text{round}\left(\frac{n_s \Delta t_s}{\Delta t_c}\right) \quad (50a)$$

$$\Delta k_{fc} = \text{round}\left(\frac{m_f \Delta t_c}{\Delta t_s}\right) \quad (50b)$$

$$\Delta k_{ftyp} = \text{round}\left(\frac{m_f L_{typ} \Delta t_c}{\Delta t_s}\right) - n_s m_f \quad (50c)$$

$$k_{fmin} = \text{round}\left\{\left[\left(\frac{m_f\{k_{min}+1\}}{m}\right) - \left(\frac{a_{fix} k_{fmid}}{b_{fix}}\right)\right] / \left[1 - \left(\frac{a_{fix}}{b_{fix}}\right)\right]\right\} \quad (50d)$$

$$k_{fmax} = \text{round}\left\{\left[\left(\frac{m_f\{k_{max}-1\}}{m}\right) - \left(\frac{a_{fix} k_{fmid}}{b_{fix}}\right)\right] / \left[1 - \left(\frac{a_{fix}}{b_{fix}}\right)\right]\right\} \quad (50e)$$

The constant $L_{typ}$ is the typical number of code chips per data word. It is the nominal increment to $\mu_v$ per data word. The constant $\Delta k_{fc}$ equals the number of fine-scale time intervals per PRN code chip. The constant $\Delta k_{fc}$ is used to adjust $k_{fv}$ up or down if $k_{fv}$ falls outside of the limits: $k_{fmin} \leq k_{fv} \leq k_{fmax}$. The constant $\Delta k_{ftyp}$ is the nominal increment to $k_{fv}$ per data word. The limits $k_{fmin}$ and $k_{fmax}$ are approximately the limits $k_{min}$ and $k_{max}$ from equations (33a) and (33b) re-scaled to the new fine time scale and adjusted for the difference between the nominal code chipping rate of the x(i) tables and the actual chipping rate of the accumulation. The extra −2 term on the right-hand side of equation (33a) is compensated for by the increment to $k_{min}$ on the right-hand side of equation (50d) and the decrement to $k_{max}$ on the right-hand side of equation (50e). The original −2 term and the increment and decrement have been included because they ensure that $k_f$ values which respect the limits in equation (50d) and (50e) are transformed into k values that respect the limits in equations (33a) and (33b).

The iteration begins by initializing $k_{f1}$ and $\mu_1$ for the first data word. The nominal initial values are:

$$k_{f1nom} = \text{round}\left\{\left[\left(\frac{\Delta t_{start}}{\Delta t_c}\right) + 1 + \text{floor}\left(\frac{-\Delta t_{start}}{\Delta t_c}\right)\right]\left[\frac{\Delta t_c m_f}{\Delta t_s}\right]\right\} \quad (51a)$$

$$\mu_{1nom} = \text{floor}\left(\frac{-\Delta t_{start}}{\Delta t_c}\right) + 1 + L \quad (51b)$$

It is possible that $k_{f1nom}$ from equation (51a) can violate its upper limit $k_{fmax}$. Therefore, the following conditional adjustment can be implemented in order to finish the initialization.

$$k_{f1} = \begin{cases} k_{f1nom} & \text{if } k_{f1nom} \leq k_{fmax} \\ k_{f1nom} - \Delta k_{fc} & \text{if } k_{fmax} < k_{f1nom} \end{cases} \quad (52a)$$

$$\mu_1 = \begin{cases} \mu_{1nom} & \text{if } k_{f1nom} \leq k_{fmax} \\ \mu_{1nom} - 1 & \text{if } k_{fmax} < k_{f1nom} \end{cases} \quad (52b)$$

Given this initialization, the calculation of $(k_{f2}, \mu_2)$, $(k_{f3}, \mu_3)$, $(k_{f4}, \mu_4)$, . . . , $(k_{fN}, \mu_N)$ proceeds according to the following iteration:

$$k_{fvnom} = k_{f(v-1)} + \Delta k_{ftyp} \text{ for } v=2,3,4,\ldots,N \quad (53a)$$

$$\mu_{vnom} = \mu_{(v-1)} + l_{typ} \text{ for } v=2,3,4,\ldots,N \quad (53b)$$

$$k_{fv} = \quad (54a)$$
$$\begin{cases} k_{fvnom} + \Delta k_{fc} & \text{if } k_{fvnom} < k_{fmin} \\ k_{fvnom} & \text{if } k_{fmin} \leq k_{fvnom} \leq k_{fmax} \text{ for } v=2,3,4,\ldots,N \\ k_{fvnom} - \Delta k_{fc} & \text{if } k_{fmax} < k_{fvnom} \end{cases}$$

$$\mu_v = \begin{cases} \mu_{vnom} + 1 & \text{if } k_{fvnom} < k_{fmin} \\ \mu_{vnom} & \text{if } k_{fmin} \leq k_{fvnom} \leq k_{fmax} \text{ for } v=2,3,4,\ldots,N \\ \mu_{vnom} - 1 & \text{if } k_{fmax} < k_{fvnom} \end{cases} \quad (54b)$$

The table look-up calculations finish with the computation of $k_v$, $i_v$, and the actual table look-ups:

$$k_v = \text{round}\left[\frac{m k_{fvfix}(k_{fv})}{m_f}\right] \text{ for } v=1,2,3,\ldots,N \quad (55)$$

The round( ) operation in equation (55) can be implemented by adding $m_f/2$ to $m \times k_{fvfix}(k_{fv})$ before the rightward bit shift that constitutes division by $m_f$. The result of the division will be the correct value of $k_v$ for any sign of $k_{fvfix}(k^{fv})$ if the computer works with 2's compliment notation for signed integers and if the rightward bit shift fills in from the left with the 2's compliment sign bit, i.e., with the left-most bit.

Given $k_v$ from equation (55) and $\mu_v$ from equation (54b), one can use equation (45) to compute $i_v$. This value, in turn, can be used to index into the tables to determine the Prompt PRN code sign 29A (FIGS. 2D and 3A), $x_{pv}$, the early-minus-late PRN code zero mask 35B (FIGS. 2D and 3A), $x_{emlzmv}$, and the early-minus-late PRN code sign 35A (FIGS. 2D and 3A), $x_{eml2sv}$, that correspond to data word $W_v$:

$$x_{pv} = x_p(i_v) \text{ for } v = 1, 2, 3, \ldots, N \quad (56a)$$

$$x_{emlzmv} = x_{emlzm}(i_v) \text{ for } v = 1, 2, 3, \ldots, N \quad (56b)$$

$$x_{eml2sv} = x_{eml2s}(i_v) \text{ for } v = 1, 2, 3, \ldots, N \quad (56c)$$

The conditionals in equations (54a) and (54b) can be reduced to a single conditional per data word during normal operation to improve efficiency. This can be done because the sign of $\Delta k_{ftyp}$ in equation (53a) is fixed for a given accumulation interval. (Normally the sign of $\Delta k_{ftyp}$ does not vary from accumulation interval to accumulation interval or from channel to channel for a given receiver because the only variable quantity that affects $\Delta k_{ftyp}$ is actual chip length 65 (FIG. 2D), $\Delta t_c$, which normally does not vary significantly.) If $\Delta k_{ftyp} < 0$, then the proper formula for determining $k_{fv}$ and $\mu_v$ can be chosen by considering the inequality $k_{fvnom} < k_{fmin}$. Conversely, if $\Delta k_{ftyp} > 0$, then the proper formula can be determined by considering the inequality $k_{fvnom} > k_{fmax}$. The decision about which condition to check can be made at the beginning of the accumulation because $\Delta k_{ftyp}$ is calculated prior to execution of the iteration in equations (53a)-(56c).

When using a processor that creates instruction pipelines, "if" statements can disrupt the pipeline. In this case equations (54a) and (54b) can be replaced with the following computations:

$$\eta_{fv} = \begin{cases} \min[0, \text{sign}(k_{fvnom} - k_{fmin})] & \Delta k_{ftyp} < 0 \\ 0 & \Delta k_{ftyp} = 0 \\ \max[0, \text{sign}(k_{fvnom} - k_{fmax})] & \Delta k_{ftyp} > 0 \end{cases} \quad (57a)$$

for $v = 2, 3, 4, \ldots, N$ $$k_{fv} = k_{fvnom} - \eta_{fv} \Delta k_{fc} \text{ for } v = 2, 3, 4, \ldots, N \quad (57b)$$

$$\mu_v = \mu_{vnom} - \eta_{fv} \text{ for } v = 2, 3, 4, \ldots, N \quad (57c)$$

The min( ) and max( ) functions return, respectively, the minimum or maximum of their two input arguments. The variable $\eta_{fv}$ is normally zero, in which case equations (57b) and (57c) leave $k_{fv}$ equal to $k_{fvnom}$ and $\mu_v$ equal to $\mu_{vnom}$. The value of $\eta_{fv}$ is $-1$ if $\Delta k_{ftyp} < 0$ and $k_{fvnom} < k_{fmin}$, and $+1$ if $\Delta k_{ftyp} > 0$ and $k_{fvnom} > k_{fmax}$. In both of these cases $\eta_{fv}$ causes equation (57b) and (57c) to perform the necessary adjustments to $k_{fv}$ and $\mu_v$. Note that efficient code may not execute the conditional in equation (57a) once per data word. Instead, its accumulation iterations could be performed in one of three different iterative loops, depending on the value of $\Delta k_{ftyp}$. Additional economies can be had in the first and third conditional clauses of equation (57a). The value of $-\eta_{fv}$ for the first condition is equal to the sign bit of the 2's compliment representation of $k_{fvnom} - k_{fmin}$. Similarly, $+\eta_{fv}$ for the third condition is equal to the sign bit of the 2's compliment representation of $k_{fmax} - k_{fvnom}$. In either case, $\eta_{fv}$ (or its negative) can be computed in two operations.

Figure 7:
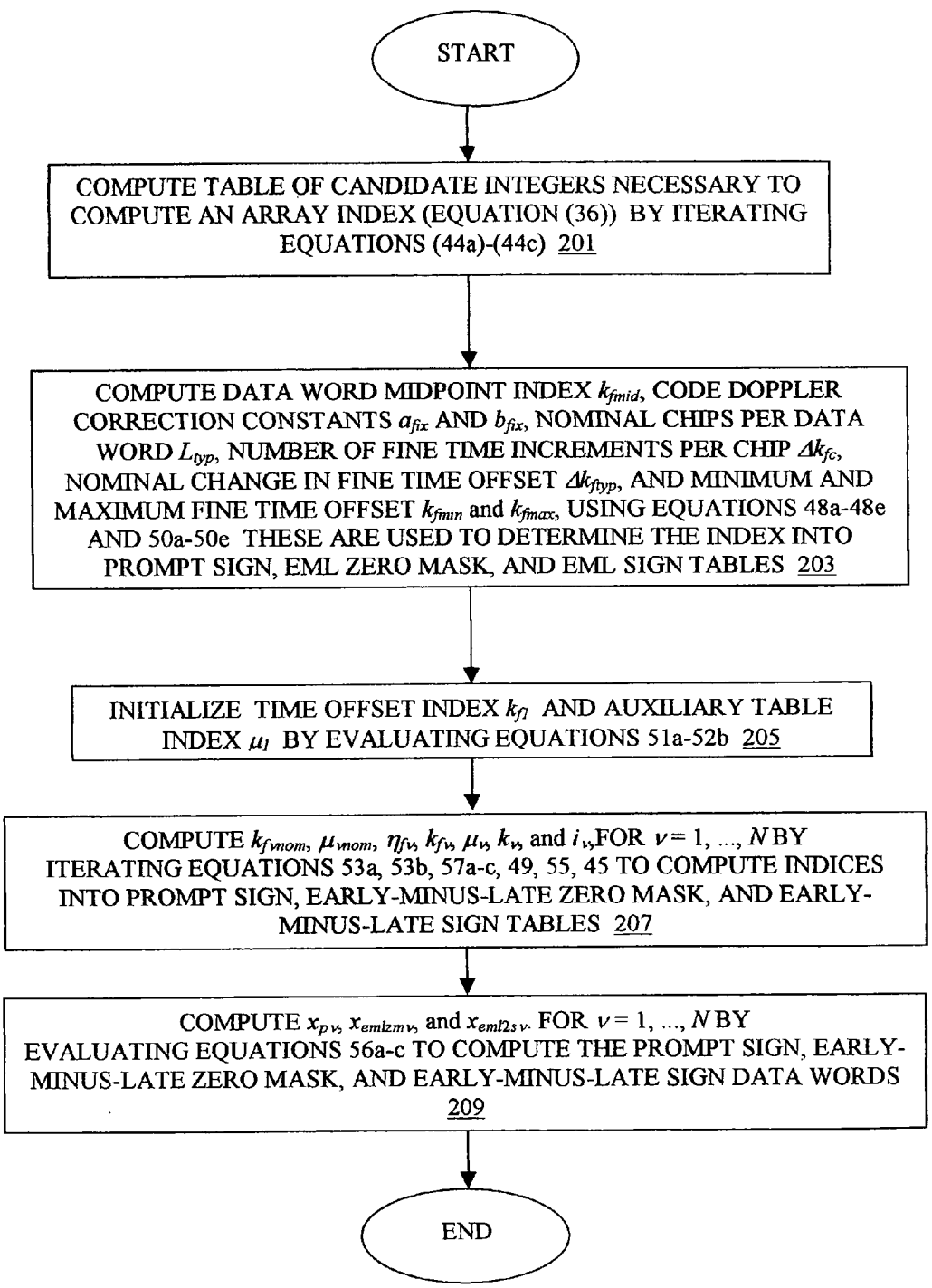
FIG. 7 is a flowchart of the method for computing bit-wise parallel representations of the over-sampled prompt PRN code replica and the over-sampled early-minus-late PRN code replica for an entire accumulation interval using the real-time over-sampled PRN code generation algorithm.

Summarizing real-time over-sampled PRN code generator 30A (FIG. 3A) and referring now to FIG. 7, to compute prompt PRN code 29 (FIG. 3A) and early-minus-late PRN code 35 (FIG. 3A) for an entire accumulation interval, the method includes the steps of iterating equations (44a)-(44c) (method step 201, FIG. 7) to construct the table of $\Delta i(\mu)$ values. The method further includes the step of computing the auxiliary constants (method step 203, FIG. 7) in equations (48a)-(48e) and (50a)-(50e). The method further includes the step of initializing $k_{f1}$ and $\mu_1$ (method step 205, FIG. 7) by evaluating equations (51a)-(52b). The method further includes the step of iterating equations (53a), (53b), (57a)-(57c), (49), (55), and (45) (method step 207, FIG. 7) to compute, for each iteration, $k_{fvnom}$, $\mu_{vnom}$, $\eta_{fv}$, $k_{fv}$, $\mu_v$, $k_v$, and $i_v$. The method further includes the step of iterating equations (56a)-(56c) (method step 209, FIG. 7) to compute, for each iteration, $x_{pv}$, $x_{emlzmv}$, and $x_{eml2sv}$.

As mentioned already, it may prove efficient to interleave the equations (44a-c) iterations and the accompanying shift register iterations between the iterations that compute $k_{fvnom}$ through $x_{eml2sv}$. In this scenario $\mu v$ can be computed from equation (57c). Afterwards, the shift register iterations that generate code chips $C(\mu_{v1}-1)$ though $C(\mu_v-1)$ can be performed, and these chip values can be used to iterate equations (44a-c) from $\mu_{v-1}$ to $\mu_v$ in order to determine $\Delta i(\mu_v)$ from $\Delta i(\mu_{v-1})$.

The software correlator 19 (FIG. 1) of the present invention can advantageously be easily modified to work with signals at different frequencies, new PRN codes, or even signals for different types of devices. Thus, the same hardware could use the software correlator 19 (FIG. 1) to implement such devices as a GPS receiver, a cell phone, or both. To allow for new codes, new frequencies, and new types of functionality, small changes can be made in the software correlator 19 (FIG. 1), or different versions of the software correlator 19 (FIG. 1) can be run on the same processor. The changes involve using a different baseband mixing frequency and a different PRN code in the correlation, and perhaps changes that would provide the new signals of interest to the software correlator 19 (FIG. 1). In order for the present invention to work with signals at different frequencies, new PRN codes, or signals for different devices, two fundamental changes need to be made. First, the baseband mixing frequency must be tailored to that of the signal data 21, which also involves pre-computing and storing sine and cosine tables at this new frequency. Second, new pre-computed over-sampled PRN code tables 28 (FIG. 3A) must be constructed. The size of the new tables should match the over-sampled accumulation period, or at least one over-sampled period of the PRN code. As an alternative to generating new pre-computed over-sampled PRN code tables 28 (FIG. 3A), the new PRN codes can be generated in real-time by over-sampled PRN code generator 30A (FIG. 3A). Also, the system and method of the present invention could be implemented within systems such as GLONASS receivers, cell phones and cell base stations, pagers, wireless Ethernet (e.g. 802.11x standards), Bluetooth™, Blackberry® wireless internet devices, and satellite radio/phones (e.g. INMARSAT®). In fact, the system and method of the present invention are applicable to any sort of telecommunication system/device that uses spread spectrum, code division multiple access (CDMA) pseudo random number codes for the transmission of information, either wired or wireless.

Figure 8:
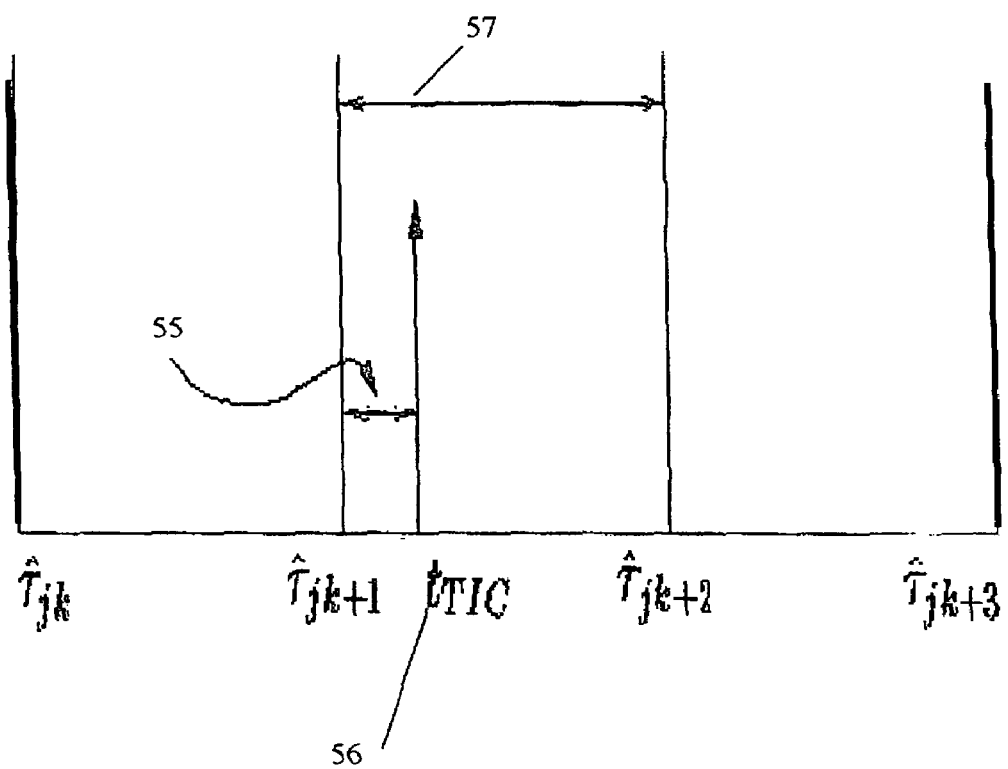
FIG. 8 is a graphic representation of a plot that illustrates the location in time at which the code phase of each signal is computed.

Referring now to FIG. 8, navigation calculations require measured values of the PRN code phase 55, carrier phase, and carrier frequency. The measurements for all tracked satellites must be taken at exactly the same time. A time interval counter (TIC) function provides a periodic timing scheme to synchronize these measurements at time $t_{TIC}$ 56. At time $t_{TIC}$ 56, the TIC function latches all of the PRN code phase 55, carrier phases, and carrier frequencies along with the code epoch counters, and software correlator 19 (FIG. 1) makes these available to application-specific code 15 (FIG. 1), for example, GPS receiver software. GPS receiver software uses the code phase and epoch counters to compute the pseudo range to each satellite. Software correlator 19 (FIG. 1) keeps track of the code and carrier phase of each signal as determined by the code chipping rate and the carrier Doppler shift inputs. The quantity $\hat{f}_{cjk}$, the estimated code chipping rate of software receiver 10 for satellite j during its $k^{th}$ PRN code period, can be determined either by an acquisition search procedure, or if tracking, by a delay-locked loop. Likewise, $\hat{\omega}_{Doppjk}$, the associated carrier Doppler shift, can be defined by an acquisition procedure or, if tracking has commenced, by a phase-locked loop or a frequency-locked loop. These determinations are made by application-specific code 15 (FIG. 1). Software correlator 19 (FIG. 1) can use these two frequencies to update quantities that keep track of its code and carrier phases according to the formulas:

$$\hat{\tau}_{jk+1} = \hat{\tau}_{jk} + \frac{1023}{\hat{f}_{cjk}} \qquad (58)$$

$$\hat{\Phi}_{jk+1} = \hat{\Phi}_{jk} + \hat{\omega}_{Doppjk+1}(\hat{\tau}_{jk+1} - \hat{\tau}_{jk}) \qquad (59)$$

Software correlator 19 (FIG. 1) can keep a running track of these quantities and can initialize these iterations as part of the signal acquisition calculations that it carries out in conjunction with application-specific code 15 (FIG. 1). The quantities $\hat{\tau}_{j0}$ and $\hat{\phi}_{j0}$ are either sent to software correlator 19 by application-specific code 15, or they are initialized arbitrarily by software correlator 19 and application-specific code 15 executes feedback control of $\hat{f}_{cjk}$ and $\hat{\omega}_{Doppjk}$ to force the sequences defined by equations (58) and (59) to converge to appropriate values. Information about the previously-described conventional method can be found in Dierendonck.

The TIC time $t_{TIC}$ 56 (FIG. 8) can occur at, for example, the millisecond boundaries of the receiver clock. At each time $t_{TIC}$ 56, the PRN code phase 55 (FIG. 8) of each signal is computed in the following manner:

$$\hat{\psi}_{jTIC} = 1023\left(\frac{t_{TIC} - \hat{\tau}_{jk+1}}{\hat{\tau}_{jk+2} - \hat{\tau}_{jk+1}}\right) \qquad (60)$$

where $\hat{\psi}_{jTIC}$ is the PRN code phase 55 (FIG. 8) in chips of signal j at TIC time $t_{TIC}$ 56 (FIG. 8). The epoch counters, which are simply a running total of the number of code periods 57 (FIG. 8), are incremented at each code start/stop time.

The carrier phase calculation at time $t_{TIC}$ 56 (FIG. 8) is similar to the PRN code phase 55 (FIG. 8) calculation:

$$\hat{\phi}_{jTIC} = \hat{\phi}_{jk+1} + \hat{\omega}Doppjk+1(t_{TIC} - \hat{\tau}_{jk+1}) \qquad (61)$$

where $\hat{\phi}_{jTIC}$ is the carrier phase at time $t_{TIC}$ 56. The Doppler shift that gets returned at time $t_{TIC}$ 56 (FIG. 8) is $\hat{\omega}_{Doppjk+1}$.

With respect to the performance of the system and method of the present invention, a sample screen-shot from the illustrative embodiment of the present invention is provided in Table 8. This table illustratively shows the tracking of nine channels. The roof-mounted L1 antenna of the illustrative embodiment can have a pre-amp with 26 dB of gain. The software correlator 19 (FIG. 1) of the present invention can provide positional accuracy on the order of 10-15 meters when working in conjunction with application specific software 15 (FIG. 1).

TABLE 8

Numerical GPS tracking data output by the illustrative embodiment.

| Lat | 42.44354 | Spd | 0.5 | SVs | 8 | Ctrack | | FLL | | Date | 17/10/02 |
| Lon | −76.48143 | Hdg | 327.0 | Nav | 3D | GDOP | | 1.9 | | GPS | 19:58:11 |
| Alt | 269.6560 | ROC | −0.7 | HI ELEV | | DO | | −393.0 | | OscErr | 0.25 |

| CH | SV | ELV | AZI | DOPP | NCO | UERE | SF | PRerr | PRRerr | LOCK | SNR | iS4 |
|---|---|---|---|---|---|---|---|---|---|---|---|---|
| 1 | 1 | 67 | 237 | −528 | −927 | 4 | 1 | 9.0 | 0.7 | CCBF | 16.9 | −1.000 |
| 2 | 22 | 64 | 47 | −1644 | −2045 | 4 | 1 | 14.3 | 0.6 | CCBF | 18.0 | −1.000 |
| 3 | 3 | 50 | 152 | 2174 | 1778 | 2 | 1 | 5.5 | −0.4 | CCBF | 18.4 | −1.000 |
| 4 | 25 | 22 | 106 | −2650 | −3050 | 2 | 1 | 42.9 | 0.2 | CCBF | 13.2 | −1.000 |
| 5 | 17 | 1 | 62 | 1722 | 1331 | 2 | 1 | 7.5 | −0.4 | CCBF | 8.1 | −1.000 |
| 6 | 15 | 2 | 81 | 2278 | 1887 | 2 | 1 | −5.2 | −0.7 | CCBF | 7.4 | −1.000 |
| 7 | 27 | 12 | 295 | 2969 | 2575 | 0 | 1 | 0.0 | 0.0 | CCBF | 8.0 | −1.000 |
| 8 | 13 | 44 | 303 | 1856 | 1866 | 2 | 0 | 0.0 | 0.0 | C | 14.9 | −1.000 |
| 9 | 31 | 22 | 185 | 3860 | 3464 | 2 | 1 | −11.0 | −0.5 | CCBF | 15.9 | −1.000 |
| 10 | — | — | — | — | — | — | — | — | — | | — | — |
| 11 | — | — | — | — | — | — | — | — | — | | — | — |
| 12 | 20 | 4 | 219 | −3086 | −3483 | 2 | 1 | 27.5 | 0.3 | CCBF | 9.6 | −1.000 |

Two comparison tests illustrate the performance of the system and method of the present invention. In the first test, a first configuration includes a MITEL® GP2021 hardware correlator, but is in all other ways identical to a second configuration that includes the software correlator 19 (FIG. 1) of the present invention. The two configurations differ in SNR by less that 1 dB and in navigation solutions by no more than 5-10 meters. In the second test, timing studies using the system of the present invention show that processing six channels uses only about 20% of the processor's capacity, while Akos 2001a report a real-time software GPS receiver that would require 100% of the capacity a 1.73 GHz microprocessor to implement a 6-channel GPS receiver when processing data from an RF front-end with a sampling frequency of 5.714 MHz.

Figure 9A:
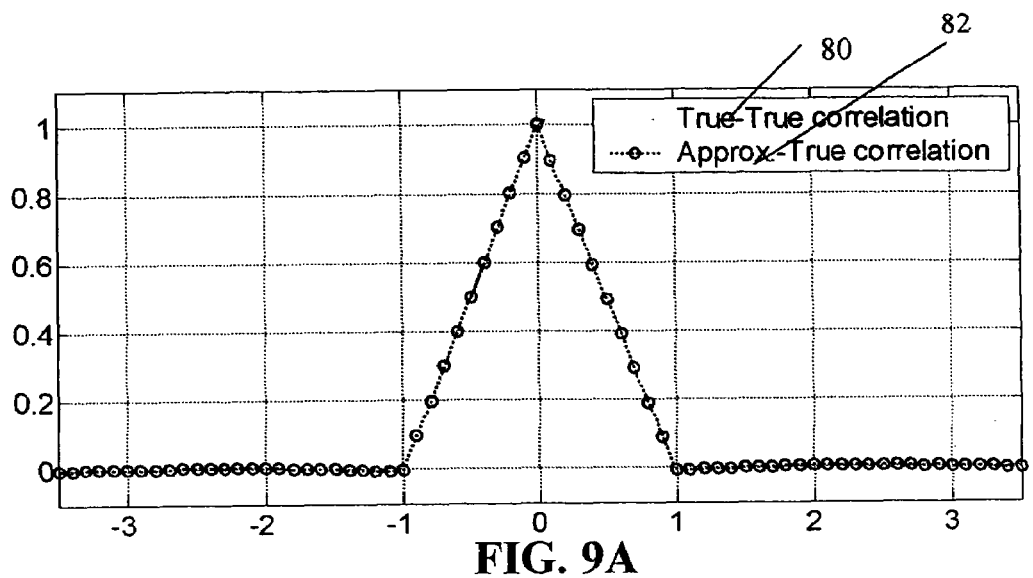
FIGS. 9A and 9B are graphic representations of plots of correlations of the true sampled code with prompt (FIG. 9A) and early-minus-late (FIG. 9B) versions of the true and table look-up codes, the latter being generated by the new real-time over-sampled PRN code generator.
Figure 9B:
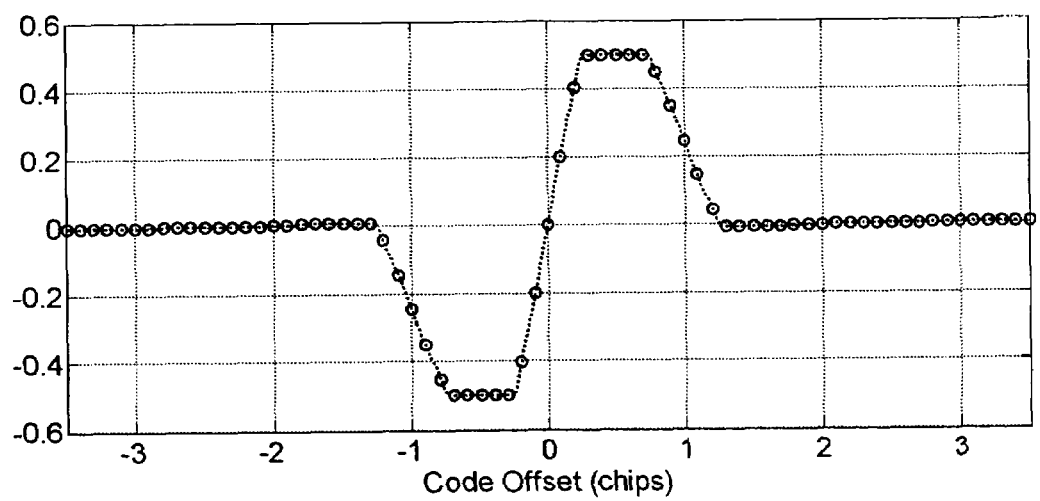

Referring now to FIGS. 9A and 9B, among other indicators that could assess the accuracy of the PRN code generated by real-time over-sampled PRN code generator 30A (FIG. 3A), which includes prompt PRN code sign 29A (FIG. 3A), early-minus-late PRN code sign 35A (FIG. 3A), and early-minus-late PRN code zero mask 35B (FIG. 3A), is the low distortion of the generated codes versus the true codes. FIG. 9A, generated for prompt code comparisons, shows juxtaposed plots of the autocorrelation function 80 (FIG. 9A) of the sampled true code and the cross correlation function 82 (FIG. 9A) between the sampled true code and the sampled code as generated from the new $x_p$ table. FIG. 9B shows a similar comparison for early-minus-late PRN code 35 (FIG. 3A). In either case, the nominal chipping frequency is $f_{cnom}=1/\Delta t_{cnom}=1.023$ Mfz, the sampling frequency is $f_s=1/\Delta t_s=12.199$ MHz, and the code timing resolution of the table is m=12, i.e., $\frac{1}{12}^{th}$ of a sample. This resolution translates into approximately $\frac{1}{143}^{rd}$ of a code chip. The actual chipping rate differs from the nominal by $(f_c-f_{cnom})=1.5$ Hz. This Doppler shift of the code chipping rate corresponds to a significant non-zero range rate between the receiver and the transmitter, 438 m/sec. The correlations are accumulated over 10230 code chips, and the code is a time-multiplexed version of a pair of the new GPS civilian L2 CL and CM codes. The data word indexing calculations for this example use a code chip start time resolution of $\Delta t_s/10^5$, i.e., $m_f=10^5$.

It is obvious from FIGS. 9A and 9B that prompt PRN code 29 (FIG. 3A) and early-minus-late PRN code 35 (FIG. 3A) distortion is very small. The correlations produced using the new tables are virtually identical to those produced from the exact code. The low distortion of the new approach is best characterized by two parameters: the amount by which the correlation peak of the prompt PRN code sign 29A (FIG. 3A) droops below one and the offset of the zero-crossing time of the early-minus-late PRN code 35 (FIG. 3A). The former metric characterizes the power loss of the new approach, and the latter metric characterizes the net timing error. The droop of the prompt peak is only 0.3% of the nominal amplitude, which translates into a 0.03 dB loss. The timing distortion of the new code is less than $4\times10^{-4}$ code chips. This distortion is very small; it translates into about 0.1 m of GPS range measurement error.

It may seem paradoxical that the code timing error is only $4\times10^{-4}$ code chips when the code timing granularity of the x(i) tables is $\Delta t_s/(m\Delta t_c)\cong 7\times 10^{-3}$ code chips. The resolution of this paradox lies in the averaging effect of the accumulations. The length of a code chip equals 143.099269 code offset time grid intervals for the example shown in FIGS. 9A and 9B. The non-integer nature of this number causes the code offset errors of the x(i) tables to get dithered as the accumulation works its way through successive data words. This dithering tends to average out the table granularity errors, and this averaging can reduce the net timing error by an order of magnitude or more, as shown in FIG. 9B.

Although the invention has been described with respect to various embodiments, it should be realized this invention is also capable of a wide variety of further and other embodiments.

What is claimed is:

1. A method for computing prompt and early-minus-late in-phase and quadrature summed accumulations for a plurality of signals from a plurality of channels comprising the steps of:
    representing a carrier replica signal from the at least one channel from the plurality of channels as a carrier replica sign and a carrier replica magnitude;
    representing signal data from the at least one channel of the plurality of channels as at least one signal word;
    computing a baseband mixed sign as a function of the carrier replica sign and the at least one signal word;
    computing a baseband mixed magnitude as a function of the carrier replica magnitude;
    selecting a pseudo-random number (PRN) code having a prompt PRN code and an early-minus-late PRN code;
    representing the prompt PRN code as a prompt PRN code sign;
    computing a fully mixed prompt integrand sign as a function of the baseband mixed sign and the prompt PRN code sign;
    representing the early-minus-late PRN code as an early-minus-late PRN code sign and an early-minus-late PRN code zero mask;
    computing a fully mixed early-minus-late integrand sign as a function of the baseband mixed sign and the early-minus-late PRN code sign;
    computing at least one set of prompt integrand value words as a function of the fully mixed prompt integrand sign and the baseband mixed magnitude;
    computing at least one set of early-minus-late integrand value words as a function of the fully mixed early-minus-late integrand sign, the baseband mixed magnitude, and early-minus-late PRN code zero mask;
    computing prompt in-phase and quadrature summed accumulations for the plurality of channels for an accumulation interval as functions of the number of significant bits in the at least one set of prompt integrand value words and as functions of the values associated with the at least one set of prompt integrand value words; and
    computing early-minus-late in-phase and quadrature summed accumulations for the plurality of channels as functions of the number of significant bits in the at least one set of early-minus-late integrand value words and as functions of the values associated with the at least one set of early-minus-late integrand value words; and
    supplying the prompt and early-minus-late in-phase and quadrature summed accumulations to a software receiver to compute navigation data.

2. The method as in claim 1 further comprising the step of:
    retrieving the carrier replica signal from a carrier replica table, the carrier replica table representing a coarse grid of frequencies.

3. The method as in claim 1 further comprising the steps of:
    representing the signal word from the at least one channel as a signal sign and a signal magnitude; and
    computing at least one baseband mixed magnitude as a function of the carrier replica magnitude and the signal magnitude.

4. The method as in claim 3 further comprising the step of:
retrieving the carrier replica signal from a carrier replica table, the carrier replica table representing a coarse grid of frequencies.

5. The method as in claim 1 further comprising the steps of:
receiving at least one radio frequency (RE) signal from the at least one channel from the plurality of channels;
digitizing the at least one RE signal; and
mixing the at least one RE signal to form signal data using bit-wise parallelism.

6. The method as in claim 5 wherein the at least one RE signal is a multi-bit signal.

7. The method as in claim 5 further comprising the steps of:
down-convening the at least one RE signal to an intermediate frequency; and
digitizing the intermediate frequency.

8. The method as in claim 5 further comprising the step of:
receiving the at least one RE signal from a global positional source.

9. The method as in claim 1 wherein said step of computing a fully mixed prompt integrand sign is performed using bit-wise parallelism.

10. The method as in claim 1 wherein said step of computing fully mixed early-minus-late integrand sign and is performed using bit-wise parallelism.

11. The method as in claim 1 further comprising the step of:
rotating the in-phase and quadrature summed accumulations to correct for effects of frequency and phase granularity of the signal data.

12. The method as in claim 1 further comprising the step of:
computing navigation data using the prompt in-phase and quadrature summed accumulations and the early-minus-late in-phase and quadrature summed accumulations.

13. The method as in claim 1 further comprising the step of
retrieving the carrier replica signal from a carrier replica table, the carrier replica table representing a coarse grid of frequencies.

14. The method as in claim 1 wherein said step of computing a baseband mixed magnitude comprises the steps of:
representing the at least one signal word as a signal sign and a signal magnitude; and
computing the basehand mixed magnitude as a function of the carrier replica magnitude and the signal magnitude.

15. The method as in claim 1 further comprising the step of:
generating the PRN code using the bit-wise parallelism according to the steps of:
formulating a tabulated function for use in translating code chip and timing values into PRN code using the bit-wise parallelism;
generating at least one prompt PRN code in real-time;
choosing at least one chip value from the at least one prompt PRN code, the at least one chip value corresponding to at least one data interval that contains at least one sample of a data word, the at least one chip value having a known timing relative to the at least one data interval;
transforming the known timing into a time grid index; and
translating the at least one chip value and the time grid index during the at least one data interval into the PRN code using the bit-wise parallelism for the at least one data interval, said step of translating resulting from the use of the tabulated function.

16. The method as in claim 15 further comprising the step of:
computing the time grid index as a function of a time offset index and an auxiliary table index.

17. The method as in claim 15 further comprising the step of:
computing the time grid index iteratively as a function of a previously-computed time grid index, the at least one prompt PRN code, and the timing values associated with the at least one prompt PRN code.

18. A node in a computer network capable of carrying out the method according to claim 1.

19. A communications network comprising at least one node for carrying out the method according to claim 1.

20. The method of claim 1 wherein said computing prompt and early-minus-late in-phase and quadrature summed accumulations for a plurality of signals from a plurality of channels is performed by a computer system receiving electromagnetic signals traveling over a computer network carrying information capable of causing a computer system in the network to perform said computing of prompt and earl-minus-late in-phase and quadrature summed accumulations for a plurality of signals from a plurality of channels.

21. A computer readable medium having instructions embodied therein for the practice of the method of claim 1.

22. A method for generating over-sampled prompt and early-minus-late pseudo-random number (PRN) codes in a bit-wise parallel format comprising the steps of:
formulating a tabulated function for use in translating code chip and timing information into over-sampled prompt and early-minus-late PRN code in the bit-wise parallel format;
generating at least one prompt PRN code in real-time;
choosing at least one chip value from the at least one prompt PRN code, the at least one chip value corresponding to at least one data interval that contains at least one sample of a data word, the at least one chip value having a known timing relative to the at least one data interval;
transforming the relative timing into a time grid index; and
translating the at least one chip value and the time grid index during the at least one data interval into the over-sampled prompt and early-minus-late PRN codes in bit-wise parallel format for the at least one data interval, said step of translating resulting from the use of the tabulated function; and
distinguishing a signal and computing its PRN code phase by correlating the signal with the over-sampled prompt and early-minus-late PRN codes in bit-wise parallel format.

23. The method as in claim 22 further comprising the step of:
computing the time grid index as a function of a time offset index and an auxiliary table index.

24. The method as in claim 22 further comprising the step of:
computing the time grid index iteratively as a function of a previously-computed time grid index, the at least one prompt PRN code, and timing values associated with the at least one prompt PRN code.

25. A method for using over-sampled prompt and early-minus-late pseudo-random number (PRN) code replica data words that are stored in a bit-wise parallel representation in a pre-computed table consisting of the steps of:
- selecting the over-sampled prompt and early-minus-late PRN code based on over-sampled prompt and early-minus-late PRN code start time as measured relative to an RF data sample time, said step of selecting substantially matching the midpoint of the over-sampled prompt and early-minus-late PRN code with a desired PRN code midpoint; and
- bit-shifting the over-sampled prompt and early-minus-late PRN code data words, said step of bit-shifting insuring that the over-sampled prompt and early-minus-late PRN code start time corresponds with a pre-selected sample interval; and
- distinguishing a signal associated with the RF data and computing its PRN code phase based on a correlation between the signal and the over-sampled prompt and early-minus-late PRN code.

26. The method of claim 1 further comprising the step of: tracking the phase of the PRN code to track the timing of its chips including the steps of:
- latching PRN code phase, carrier phase, epoch counters, and carrier frequencies at a pre-specified time;
- computing a pseudo range using the PRN code phase and the epoch counters;
- tracking and updating the PRN code phase and the carrier phase by estimating code chipping rate and carrier Doppler shift inputs; and
- computing the PRN code phase at the pre-specified time as a function of the updated code chipping rate and the pre-specified time.

\* \* \* \* \*

UNITED STATES PATENT AND TRADEMARK OFFICE
CERTIFICATE OF CORRECTION

| | |
|---|---|
| PATENT NO. | : 7,305,021 B2 |
| APPLICATION NO. | : 11/316536 |
| DATED | : December 4, 2007 |
| INVENTOR(S) | : Ledvina et al. |

Page 1 of 2

It is certified that error appears in the above-identified patent and that said Letters Patent is hereby corrected as shown below:

On the Title Page Item -56- References Cited, and further under U.S. PATENT DOCUMENTS, please add the following:

-- 6,407,699    6/2002  Yang ……………………..342/357.12
   2006/0013287 1/2006  Normark et al……………..375/142 --

On the Title Page Item -56- References Cited, and further under OTHER PUBLICATIONS, please add the following:

-- U.S. Provisional Application Serial No. 60/439,391 filed Jan. 10, 2003.
Title: Real-Time Software Receiver. Applicants: Brent M. Ledvina et al. --

In column 37, line 7 (claim 5), "radio frequency (RE)" should read -- radio frequency (RF) --

In column 37, line 9 (claim 5), "at least one RE signal" should read -- at least one RF signal --

In column 37, line 10 (claim 5), "at least one RE signal" should read -- at least one RF signal --

In column 37, line 12 (claim 6), "at least one RE" should read -- at least one RF --

In column 37, line 16 (claim 7), "at least one RE signal" should read -- at least one RF signal --

In column 37, line 20 (claim 8), "at least one RE signal" should read -- at least one RF signal --

UNITED STATES PATENT AND TRADEMARK OFFICE
CERTIFICATE OF CORRECTION

PATENT NO.       : 7,305,021 B2
APPLICATION NO.  : 11/316536
DATED            : December 4, 2007
INVENTOR(S)      : Ledvina et al.

It is certified that error appears in the above-identified patent and that said Letters Patent is hereby corrected as shown below:

In column 37, lines 33-38 (claim 12), the entire text of claim 12 should be stricken.

Signed and Sealed this

Twenty Second Day of April, 2008

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,305,021 B2 |
| APPLICATION NO. | : 11/316536 |
| DATED | : December 4, 2007 |
| INVENTOR(S) | : Ledvina et al. |

It is certified that error appears in the above-identified patent and that said Letters Patent is hereby corrected as shown below:

In column 1, line 18, please delete "N00014-02-J-1822" and insert
-- N00014-92-J-1822 --, therefor.

Signed and Sealed this

Seventeenth Day of March, 2009

JOHN DOLL
*Acting Director of the United States Patent and Trademark Office*